(12) United States Patent
Hodgson et al.

(10) Patent No.: US 11,155,194 B2
(45) Date of Patent: Oct. 26, 2021

(54) VEHICLE COMPONENT

(71) Applicant: Shanghai Yanfeng Jinqiao Automotive Trim Systems Co. Ltd., Novi, MI (US)

(72) Inventors: Thomas Scott Hodgson, Holland, MI (US); Tamanna Nabar, Grand Rapids, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 17/182,292

(22) Filed: Feb. 23, 2021

(65) Prior Publication Data

US 2021/0178950 A1 Jun. 17, 2021

Related U.S. Application Data

(63) Continuation of application No. PCT/US2020/037422, filed on Jun. 12, 2020.

(Continued)

(51) Int. Cl.
*B60R 3/00* (2006.01)
*B60N 3/00* (2006.01)
*B60R 5/04* (2006.01)

(52) U.S. Cl.
CPC .............. *B60N 3/002* (2013.01); *B60R 5/047* (2013.01)

(58) Field of Classification Search
CPC .. B60N 3/002; B60J 7/08; B60J 7/067; B60R 5/047

(Continued)

(56) References Cited

U.S. PATENT DOCUMENTS

| | | |
|---|---|---|
| 1,791,647 A | 2/1931 | Stacks |
| 1,882,982 A | 10/1932 | Schmiedeskamp |

(Continued)

FOREIGN PATENT DOCUMENTS

| | | |
|---|---|---|
| DE | 102004029003 B4 | 12/2006 |
| FR | 2872464 A1 | 1/2006 |
| FR | 3066083 B1 | 4/2019 |

OTHER PUBLICATIONS

2017 Honda Civic Type R Cargo Cover, Motor Trend, dated Jun. 13, 2017 (available at www.motortrend.com/2017-honda-civic-type-r-cargo-cover accessed Feb. 11, 2019) (3 pages total).

(Continued)

*Primary Examiner* — Jason S Morrow

(57) ABSTRACT

A component for a vehicle is disclosed. The component may comprise a roller rotatable relative to a base; a sheet coupled to the roller and movable between retracted and extended states; a lock mechanism; and a button. The lock mechanism may disengage to allow sheet movement sheet and engage to block sheet movement. The lock mechanism may comprise a latch to hold the button in an actuated position. The button may move the lock mechanism to block sheet movement. The lock mechanism may comprise an arm to engage a set of teeth of the roller to hold the sheet extended. The component may comprise an actuator to move the lock mechanism to block movement of the sheet. The actuator may provide tension in the sheet. The actuator may rotate the roller to provide tension in the sheet. The component may comprise a tonneau cover, cargo cover or retractable table.

20 Claims, 18 Drawing Sheets

Related U.S. Application Data

(60) Provisional application No. 62/860,486, filed on Jun. 12, 2019.

(58) Field of Classification Search
USPC ........................................ 296/24.34, 97.8, 98
See application file for complete search history.

(56) References Cited

U.S. PATENT DOCUMENTS

| | | | |
|---|---|---|---|
| 3,896,742 A | 7/1975 | Ferraro | |
| 5,423,588 A | 6/1995 | Eglinton | |
| 5,620,040 A | 4/1997 | Swanner | |
| 5,685,592 A | 11/1997 | Heinz | |
| 5,690,036 A | 11/1997 | Hasegawa | |
| 5,848,818 A * | 12/1998 | Flueckinger | B60R 9/00 296/37.6 |
| 5,971,433 A * | 10/1999 | Ament | B60R 21/06 280/749 |
| 6,158,805 A | 12/2000 | Blaney | |
| 6,182,931 B1 | 2/2001 | Richard | |
| 6,309,076 B1 | 10/2001 | McVicker | |
| 6,347,590 B1 | 2/2002 | D'Annunzio et al. | |
| 6,390,526 B1 | 5/2002 | Ament et al. | |
| 6,746,069 B1 | 6/2004 | McKenzie | |
| 7,114,766 B2 | 10/2006 | Becher et al. | |
| 7,347,019 B1 | 3/2008 | Shaw et al. | |
| 7,401,840 B2 * | 7/2008 | Schnoblen | B60J 1/2044 160/370.22 |
| 7,806,453 B2 | 10/2010 | Aebker | |
| 7,832,037 B2 | 11/2010 | Overton | |
| 8,590,593 B2 | 11/2013 | Kitani et al. | |
| 8,616,614 B2 * | 12/2013 | Ohtsubo | B60N 2/77 296/153 |
| 8,727,414 B2 | 5/2014 | Staib | |
| 8,769,742 B2 | 7/2014 | Thornton | |
| 8,955,575 B2 | 2/2015 | Glasl et al. | |
| 8,959,791 B2 | 2/2015 | Knell | |
| 9,758,022 B1 * | 9/2017 | Lin | B60R 5/047 |
| 10,427,577 B2 | 10/2019 | Segui et al. | |
| 2002/0139492 A1 | 10/2002 | Bettio et al. | |
| 2005/0017036 A1 | 1/2005 | Dahl et al. | |
| 2005/0121152 A1 | 6/2005 | Weinbrenner | |
| 2009/0008042 A1 | 1/2009 | Snyder et al. | |
| 2009/0020236 A1 | 1/2009 | Hansen | |
| 2009/0167043 A1 | 7/2009 | Aebker | |
| 2014/0015270 A1 | 1/2014 | Staib | |
| 2016/0001885 A1 | 1/2016 | Curtis et al. | |
| 2017/0181536 A1 | 6/2017 | De Saulles et al. | |
| 2019/0143869 A1 | 5/2019 | Sequi et al. | |
| 2020/0376988 A1 * | 12/2020 | Cha | B60R 3/02 |
| 2020/0398719 A1 * | 12/2020 | Buljan | B60N 2/943 |

OTHER PUBLICATIONS

Product information for PVC Membrane from Pfeifer FabriTec (available at https://fabritecstructures.com/tensile-membrane-structure-resources/tension-fabric-structure-materials/pvc-membrane/ accessed Feb. 11, 2019) (5 pages total).

Product information for IRGASTAT from BASF Global (available at https://plastics-rubber.basf.com/en/Plastic-Additives/Irgastat.html accessed Feb. 11, 2019) (3 pages total).

"Plastic additives for packaging applications" brochure from BASF Global (available at http://www.plasticadditives.basf.com/ev/internet/plastic-additives/en/function/conversions:/publish/content/plastic-additives/K_2016/data/Packaging_2016_Final.pdf accessed Feb. 11, 2019) (16 pages total).

Product information for anti-slip fabric from the Rubber Company (available at http://therubbercompany.com/products/anti-slip-fabric/ accessed Feb. 11, 2019) (3 pages total).

Product information for Non Slip Fabric from Heskins Ltd. (available at https://www.heskins.com/non-slip-fabric accessed Feb. 11, 2019) (2 pages total).

Product information for paints/coatings from Starshield Technologies Private Ltd. (available at http://starshield.in/ accessed Feb. 11, 2019) (21 pages total).

Product information for Teflon from the Chemours Company (available at https://www.chemours.com/Teflon_Fabric_Protector_Partners/en_US/ accessed Feb. 11, 2019) (2 pages total).

Product information anti-slip coating/spray from No Skidding Products (available at https://www.noskidding.com/product-category/anti-slip-floor-coatings/ accessed Feb. 11, 2019) (7 pages total).

International Search Report and Written Opinion from the International Searching Authority for International Patent Application No. PCT/US2020/037422 dated Oct. 9, 2020 (in English) (14 Pages).

* cited by examiner

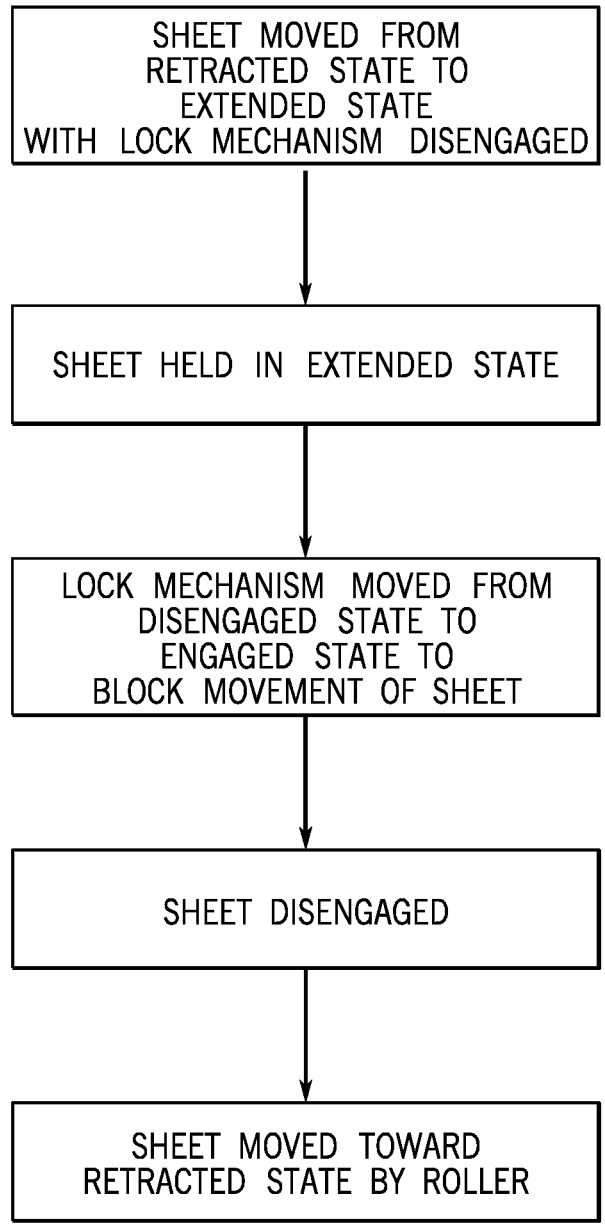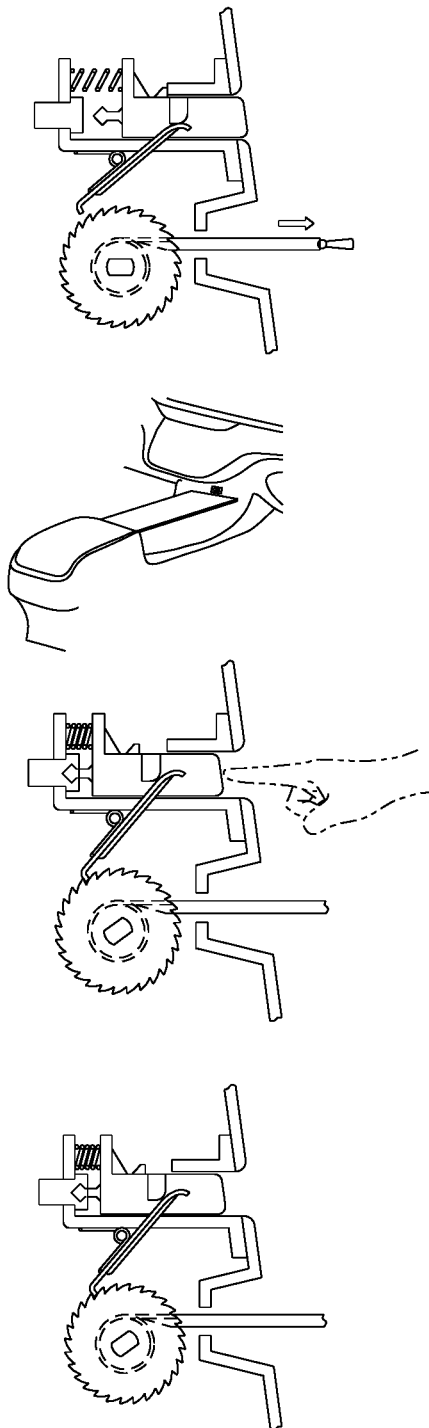
FIG. 6

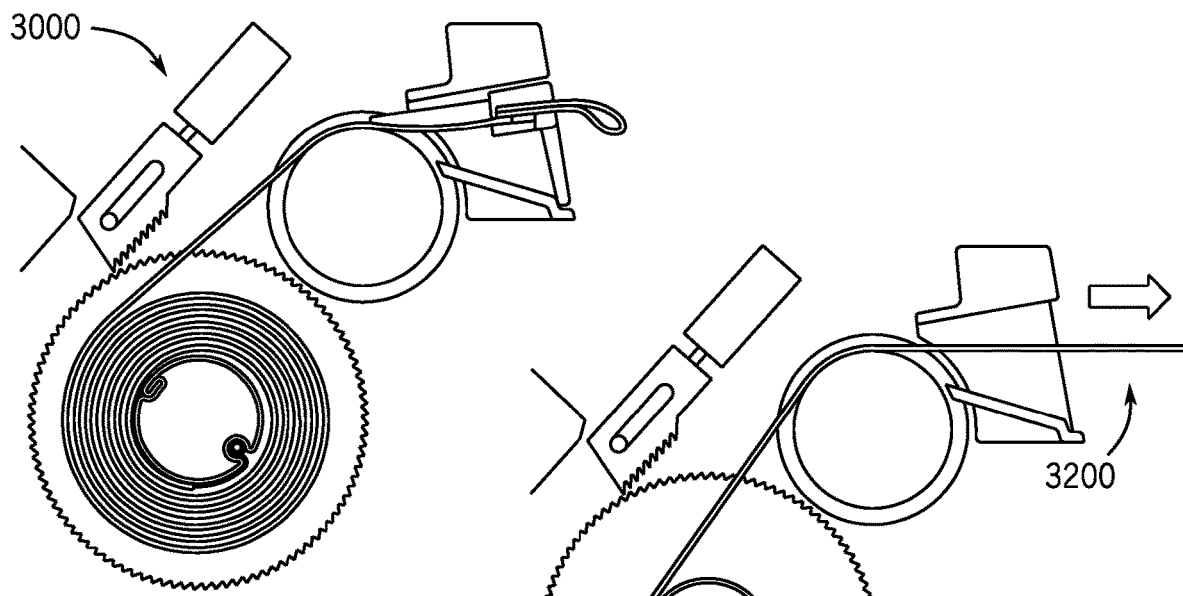
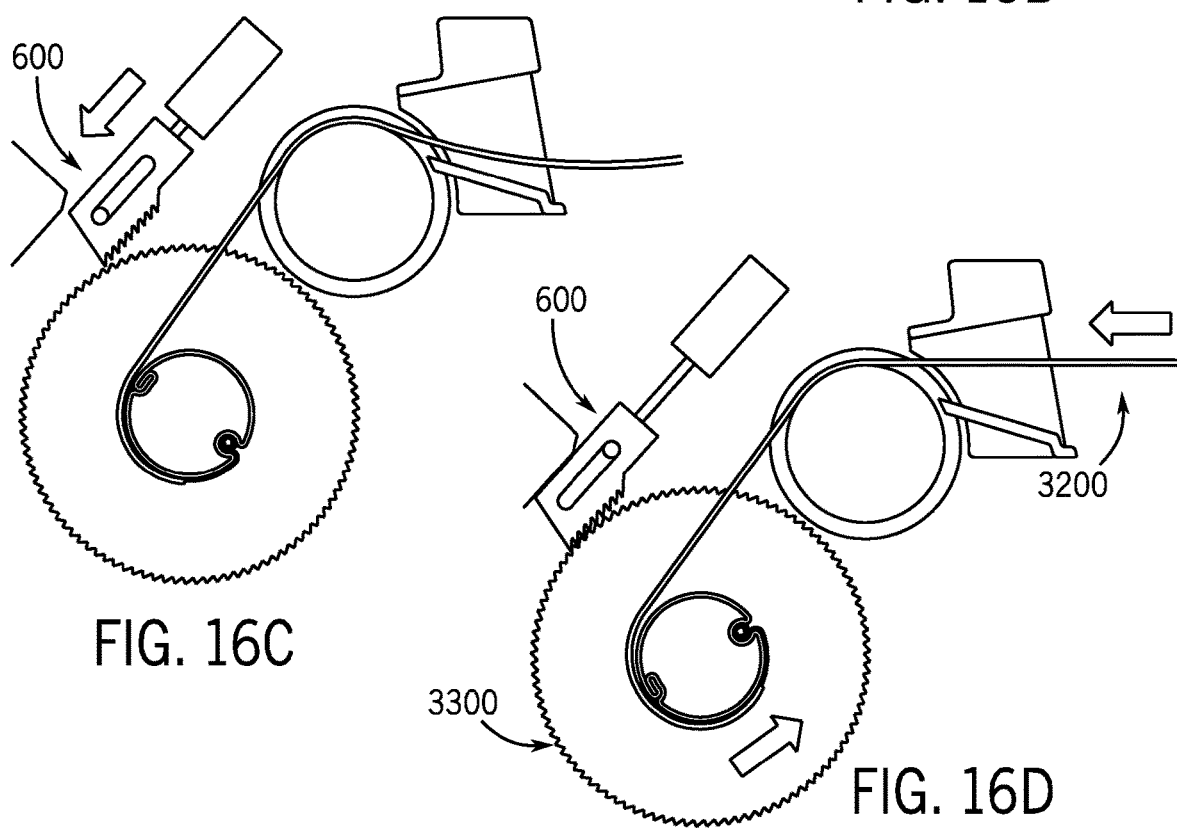

VEHICLE COMPONENT

CROSS-REFERENCE TO RELATED APPLICATIONS

The present application is a continuation of PCT/International Patent Application No. PCT/US2020/037422 titled "VEHICLE COMPONENT" filed Jun. 12, 2020, which claims the benefit of U.S. Provisional Patent Application No. 62/860,486 titled "VEHICLE COMPONENT" filed Jun. 12, 2019.

The present application claims priority to and incorporates by reference in full the following patent applications: (a) U.S. Provisional Patent Application No. 62/860,486 titled "VEHICLE COMPONENT" filed Jun. 12, 2019; (b) PCT/International Patent Application No. PCT/US2020/037422 titled "VEHICLE COMPONENT" filed Jun. 12, 2020.

FIELD

The present invention relates to a vehicle component. The present invention also relates to a vehicle interior component configured to provide a surface for use in a vehicle interior.

BACKGROUND

It is known to provide a vehicle component comprising a sheet coupled to a roller and configured to move between a retracted state and an extended state for use.

It would be advantageous to provide an improved vehicle component comprising a lock mechanism to block retraction of the sheet to provide a taut surface of the sheet when extended.

It is known for a vehicle occupant to use a surface such as a tray in vehicle interior. For example, it is known to provide a tray table structure that can be deployed from a stowed from a side compartment such as in an armrest/console or from the back of a seat. It is also known to provide a surface/sheet that can be extended/deployed from the side for use and retracted/withdrawn to the side for stowing when not in use by the vehicle occupant.

It would be advantageous to provide an improved vehicle interior component configured to provide a surface/structure for use by a vehicle occupant. It would be advantageous to provide a vehicle interior component configured to provide a surface/structure that is configured to be stowed in a retracted/compact position when not in use and to be extended to form a rigid/semi-rigid structure for the surface (e.g. sheet, sheet material, etc.) for use by a vehicle occupant.

SUMMARY

The present invention relates to a component for a vehicle comprising a base; a roller configured to rotate relative to the base; a sheet coupled to the roller and configured to move between a retracted state and an extended state; a lock mechanism; and a button. The lock mechanism may be configured for a disengaged state to allow movement of the sheet and an engaged state to block movement of the sheet. The button may be configured to move between a default position and an actuated position. The lock mechanism may comprise a latch configured to hold the button in the actuated position. The button may be configured to move the lock mechanism to the engaged state to block movement of the sheet. The component may comprise a spring; the spring may be configured to move the button toward the default position. The component may comprise a spring; the spring may be configured to bias the button in default position. The sheet may comprise at least one of (a) a fabric (b) a panel; (c) a textile; (d) a woven fabric; (e) a nylon material; (f) a mesh; (g) a polymer film laminated to a fabric; (h) a moisture resistant material. The sheet may comprise at least one of (a) a bar; (b) an opening; (c) a pin; (d) a wire; (e) a tab; (f) a closure configured to engage at least one of (1) a console; (2) a door; (3) a seat; (4) an armrest to hold the sheet in the extended position. The component may comprise at least one of (a) a tonneau cover; (b) a cargo cover; (c) a retractable table.

The present invention relates to a component for a vehicle comprising a base; a roller configured to rotate relative to the base; a sheet coupled to the roller and configured to move between a retracted state and an extended state; a lock mechanism; and a button. The lock mechanism may be configured for a disengaged state to allow movement of the sheet and an engaged state to block movement of the sheet. The roller may comprise a set of teeth; the lock mechanism may comprise an arm configured to engage the set of teeth to hold the sheet in the extended state. The button may be configured to engage the arm to provide a gap between the arm and the set of teeth. The button may comprise a latch configured to hold the button in an actuated position to prevent engagement of the button with the arm. The set of teeth may be configured to prevent movement of the sheet toward the extended state and the retracted state. The lock mechanism may comprise a spring configured to bias the arm to engage the set of teeth to hold the sheet in the extended state. The component may comprise a tab configured to compress the spring. The component may comprise a tab configured to hold the arm and provide a gap between the arm and the set of teeth. The lock mechanism may comprise a first spring, a tab, a second spring and a latch. The first spring may be configured to move the tab to engage the arm and move the arm out of engagement with the set of teeth and wherein the second spring may be configured to move the arm to engage the set of teeth in response to compression of the first spring. The latch may be configured to hold the first spring in a compressed state to allow the second spring to hold the arm in engagement with the set of teeth.

The present invention relates to a component for a vehicle comprising a base; a roller configured to rotate relative to the base; a sheet coupled to the roller and configured to move between a retracted state and an extended state; a lock mechanism; and an actuator. The lock mechanism may be configured for a disengaged state to allow movement of the sheet and an engaged state to block movement of the sheet. The actuator may be configured to move the lock mechanism to the engaged state to block movement of the sheet. The actuator may be configured to move the sheet from the extended state to a tensioned state in response to movement of the sheet to the extended state. The actuator may be configured to rotate the roller to provide tension in the sheet in the extended state. The component may comprise a sensor; the sensor may be configured to send a signal to move the actuator between the default position and the actuated position. The actuator may comprise at least one of (a) a motor; (b) a linear actuator.

The present invention relates to a component for a vehicle; the component may comprise a base, a roller configured to rotate relative to the base, a sheet coupled to the roller and configured to move between a retracted state and an extended state and a lock mechanism; the lock mechanism may be configured for a disengaged state to allow movement of the sheet and an engaged state to block movement of the sheet. The component may comprise a button; the button may be configured to move between a default position and an actuated position. The button may be configured to move the lock mechanism to the engaged state to block movement of the sheet. The lock mechanism may comprise a latch; the latch may be configured to hold the button in the actuated position. The component may comprise a spring; the spring may be configured to move the button toward the default position. The component may comprise a spring; the spring may be configured to bias the button in default position. The spring may comprise a compression spring. The roller may comprise a set of teeth; the lock mechanism may comprise an arm. The arm may be configured to engage the set of teeth to hold the sheet in the extended state. The component may comprise a button configured to engage the arm to provide a gap between the arm and the set of teeth. The button may comprise a latch configured to hold the button in an actuated position to prevent engagement of the button with the arm. The set of teeth may be configured to prevent movement of the sheet toward the extended state. The set of teeth may be configured to prevent movement of the sheet toward the extended state and the retracted state. The lock mechanism may comprise a spring configured to bias the arm to engage the set of teeth to hold the sheet in the extended state. The spring may comprise a torsion spring. The component may comprise a tab configured to compress the spring. The component may comprise a tab configured to hold the arm and provide a gap between the arm and the set of teeth. The lock mechanism may comprise a first spring, a tab, a second spring and a latch. The first spring may be configured to move the tab to engage the arm and move the arm out of engagement with the set of teeth. The second spring may be configured to move the arm to engage the set of teeth in response to compression of the first spring. the latch may be configured to hold the first spring in a compressed state to allow the second spring to hold the arm in engagement with the set of teeth. The component may comprise a spring configured to move the sheet from the extended state toward the retracted state. The roller may comprise at least one of a spool; a reel; a tube; a cylinder; (e) a wheel. The sheet may comprise at least one of a fabric a panel; a textile; a woven fabric; (e) a nylon material; (f) a mesh; (g) a polymer film laminated to a fabric; (h) a moisture resistant material. The sheet may comprise at least one of a bar; an opening; a pin; a wire; (e) a tab; (f) a closure configured to engage at least one of (1) a console; (2) a door; (3) a seat; (4) an armrest to hold the sheet in the extended position. The component may comprise at least one of a tonneau cover; a cargo cover; a retractable table. The component may comprise an actuator; the actuator may be configured to move between a default position and an actuated position. The actuator may be configured to move the lock mechanism to the engaged state to block movement of the sheet. The actuator may be configured to move the sheet from the extended state to a tensioned state in response to movement of the sheet to the extended state. The actuator may be configured to rotate the roller to provide tension in the sheet in the extended state. The component may comprise a sensor; the sensor may be configured to send a signal to move the actuator between the default position and the actuated position. The actuator may comprise a linear actuator.

The present invention relates to a component for a vehicle; the component may comprise a base, a roller configured to rotate relative to the base and a sheet coupled to the roller and configured to move between a retracted state and an extended state; the sheet may comprise a trailing edge coupled to the roller and a leading edge opposite the trailing edge; the sheet may comprise a latch at the leading edge of the sheet configured to engage at least one of (1) a console; (2) a door; (3) a seat; (4) an armrest to hold the sheet in the extended state. The sheet may be configured to move along a path between the retracted state and the extended state; the latch may be configured to engage the at least one of (1) a console; (2) a door; (3) a seat; (4) an armrest in a direction generally orthogonal to the path. The roller may be configured to move the sheet from the extended state to a tensioned state in response to engagement of the latch. The component may comprise a sensor; the sensor may be configured to send a signal to rotate the roller to provide tension in the sheet in response to engagement of the latch. The component may comprise a motor; the motor may be configured to rotate the roller to provide tension in the sheet in response to engagement of the latch. The motor may be configured to rotate the roller to move the sheet toward the retracted state in response to disengagement of the latch.

The present invention relates to a component for a vehicle; the component may comprise a base, a roller configured to rotate relative to the base and a sheet coupled to the roller and configured to move between a retracted state and an extended state; the roller may be configured to rotate to provide tension in the sheet in response to movement of the sheet to the extended state. The component may comprise at least one of an actuator; a sensor; a motor; the at least one of the actuator; the sensor; the motor may be configured to rotate the roller to move the sheet from the extended state to a tensioned state.

The present invention relates to a component for a vehicle configured to engage a base comprising an attachment point; the component may comprise a roller, a web comprising a catch configured to extend between the roller and the attachment point of the base, an actuator configured to operate the roller; the catch of the web may be configured to engage the attachment point of the base when the web is fully extended; the actuator may be configured to retract the web onto the roller when the catch of the web is disengaged from the attachment point of the base. The catch may comprise a latch. The actuator may be configured to tension the web when the catch of the web is engaged with the attachment point of the base. The actuator may be configured to retain tension in the web when the catch of the web is engaged with the attachment point of the base. The component may comprise a control configured to operate the actuator to retract the web onto the roller when the catch of the web is disengaged from the attachment point of the base. The attachment point may comprise a recess. The latch may comprise a clip configured to engage the attachment point. The clip may comprise a spring clip. The clip may be configured to engage the recess. The component may comprise a latch mechanism comprising the clip and a button configured to release the clip from the attachment point. The actuation system may comprise a controller. The controller may be coupled to the control. The control may comprise a release. The latch mechanism may comprise the release. The release may comprise a release button. The web may comprise a sheet. The web may comprise a retractable sheet. The web may comprise an extendable sheet configured to provide a surface when the latch of the web is engaged with the attachment point of the base. The surface may be configured to remain taut when the latch of the web is engaged with the attachment point of the base. The surface may be configured to remain taut when a mass is placed on the surface and the latch of the web is engaged with the attachment point of the base. The surface may be configured to remain taut when a mass is placed on the surface by operation of the roller to tension the web and the latch of the web is engaged with the attachment point of the base. The component may comprise a seat to engage the latch when the web is fully retracted onto the roller. The base may comprise the seat. The web when fully extended may be configured to extend from the seat of the base to the attachment point of the base. The web when released may be configured to retract from the attachment point of the base into the seat of the base and onto the roller. The control may be configured to operate the actuator so that the web is retracted onto the roller when the controller is actuated. The latch may be configured to operate the actuator so that the web is retracted onto the roller when the latch is released and controller is actuated. The actuator may comprise a motor. The actuator may comprise a linear actuator. The component may comprise an actuation system; the actuation system may comprise the actuator. The actuation system may comprise the actuator; the actuator may comprise a motor configured to operate the roller. The base may comprise the roller. The base may comprise the actuation system.

The present invention relates to a component for a vehicle; the component may comprise a base comprising an attachment point, a roller, a web comprising a catch configured to extend between the roller and the attachment point of the base; an actuator configured to operate the roller; the catch of the web may be configured to engage the attachment point of the base when the web is fully extended; the actuator may be configured to retract the web onto the roller when the catch of the web is disengaged from the attachment point of the base.

The present invention relates to a component for a vehicle configured to engage a base comprising an attachment point; the component may comprise a roller, a web comprising a catch configured to extend between the roller and the attachment point of the base, a motor configured to operate the roller; the catch of the web may be configured to engage the attachment point of the base when the web is fully extended; the motor may be configured to tension the web onto the roller when the catch of the web is engaged with the attachment point of the base. The component may comprise the base. The motor may be operated by a controller. The motor may comprise an actuator; and the actuator may be configured to retract the web onto the roller when the catch of the web is disengaged from the attachment point of the base. The web may be wound onto the roller when retracted. The web may be spooled onto the roller when retracted and extended from the roller when extended.

The present invention relates to a component for a vehicle configured to engage a base comprising an attachment point; the component may comprise a roller, a web configured to extend between the roller and the attachment point of the base, a lock mechanism coupled to the roller; the lock mechanism may be configured to provide (1) a locked state to restrain movement of the roller and (2) a released state to allow movement of the roller and the web. The lock mechanism may comprise a button; the button may be configured to operate the lock mechanism between the locked state and the released state. The web may be wound onto the roller when retracted and extended from the roller when extended. The web may comprise a catch configured to engage the attachment point of the base when the web is fully extended. The lock mechanism may comprise a gear coupled to the roller and a pawl configured to engage the gear to provide the locked state; the pawl is disengaged from the gear to provide the released state. The gear may comprise a sawtooth gear. The lock mechanism may comprise a spring configured to urge the button to the release state. The lock mechanism may comprise a latch configured to retain the button in the engaged state. The latch may comprise a push-push latch. The component may comprise the base. The web may be spooled onto the roller when retracted and extended from the roller when extended. The web may comprise a sheet configured to provide a surface when extended and engaged at the attachment point.

The present invention relates to a component for a vehicle comprising a base, a roller configured to rotate relative to the base, a sheet coupled to the roller and configured to move between a retracted state and an extended state, and a lock mechanism. The lock mechanism may be configured for a disengaged state to allow movement of the sheet and an engaged state to block movement of the sheet. The component may further comprise a button; the button may be configured to move between a default position and an actuated position. The button may be configured to move the lock mechanism to the engaged state to block movement of the sheet. The lock mechanism may comprise a latch; the latch may be configured to hold the button in the actuated position. The component may further comprise a spring; the spring may be configured to move the button toward the default position. The component may further comprise a spring; the spring may be configured to bias the button in the default position; the spring may comprise a compression spring. The roller may comprise a set of teeth; the lock mechanism may comprise an arm. The arm may be configured to engage the set of teeth to hold the sheet in the extended state. The component may further comprise a button configured to engage the arm to provide a gap between the arm and the set of teeth. The button may comprise a latch configured to hold the button in an actuated position to prevent engagement of the button with the arm. The set of teeth may be configured to prevent movement of the sheet toward the extended state. The set of teeth may be configured to prevent movement of the sheet toward the extended state and the retracted state. The lock mechanism may comprise a spring configured to bias the arm to engage the set of teeth to hold the sheet in the extended state; the spring may comprise a torsion spring. The component may further comprise a tab configured to compress the spring. The component may further comprise a tab configured to hold the arm and provide a gap between the arm and the set of teeth. The lock mechanism further may comprise a first spring, a tab, a second spring and a latch. The first spring may be configured to move the tab to engage the arm and move the arm out of engagement with the set of teeth. The second spring may be configured to move the arm to engage the set of teeth in response to compression of the first spring. The latch may be configured to hold the first spring in a compressed state to allow the second spring to hold the arm in engagement with the set of teeth. The component may further comprise a spring configured to move the sheet from the extended state toward the retracted state. The roller may comprise at least one of (a) a spool; (b) a reel; (c) a tube; (d) a cylinder; (e) a wheel. The sheet may comprise at least one of (a) a fabric (b) a panel; (c) a textile; (d) a woven fabric; (e) a nylon material; (f) a mesh; (g) a polymer film laminated to a fabric; (h) a moisture resistant material. The sheet may comprise at least one of (a) a bar; (b) an opening; (c) a pin; (d) a wire; (e) a tab; (f) a closure configured to engage at least one of (1) a console; (2) a door; (3) a seat; (4) an armrest to hold the sheet in the extended position. The component may comprise at least one of (a) a tonneau cover; (b) a cargo cover; (c) a retractable table.

FIGURES

FIG. 6 is a schematic diagram of operation of a vehicle component according to an exemplary embodiment.

FIGS. 16A through 16D are schematic partial section views of a vehicle component according to an exemplary embodiment.

DESCRIPTION

Figure 1A:
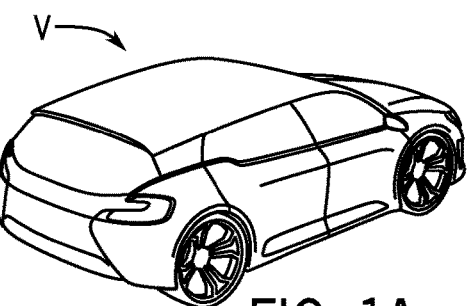
FIG. 1A is a schematic perspective view of a vehicle according to an exemplary embodiment.
Figure 1B:
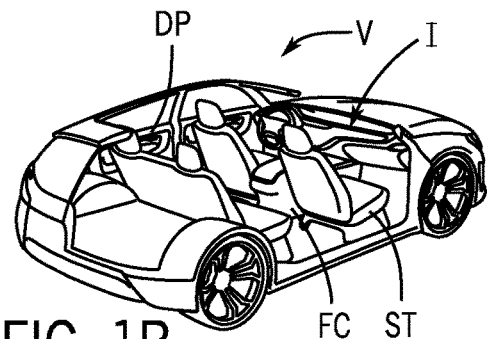
FIG. 1B is a schematic perspective view of a vehicle showing a vehicle interior according to an exemplary embodiment.
Figure 2A:
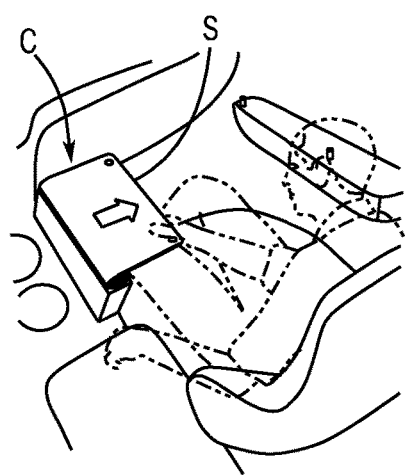
FIGS. 2A and 2B are schematic perspective views of a vehicle interior component according to an exemplary embodiment.
Figure 2B:
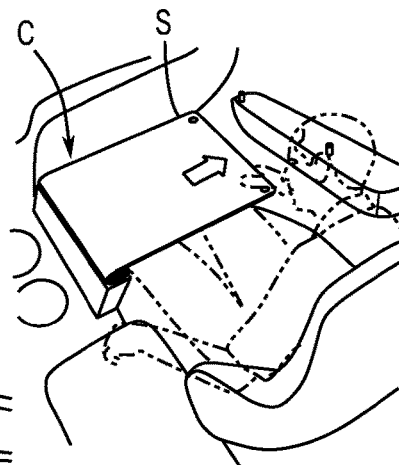
Figure 2C:
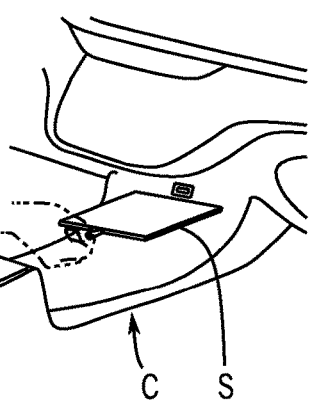
FIG. 2C is a schematic perspective view of a vehicle interior component according to an exemplary embodiment.
Figure 2D:
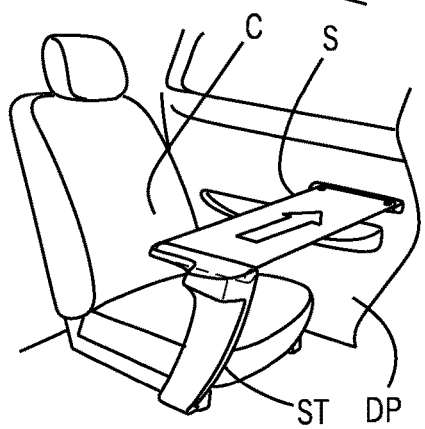
FIGS. 2D and 2E are schematic perspective views of a vehicle interior component according to an exemplary embodiment.
Figure 2E:
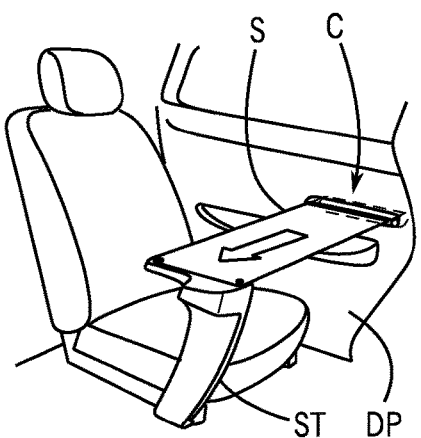
Figure 3A:
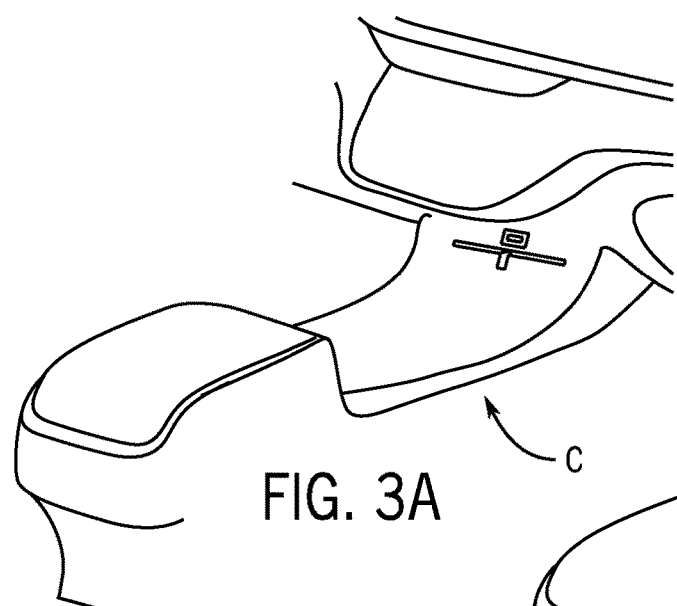
FIGS. 3A through 3D are schematic perspective views of a vehicle interior component according to an exemplary embodiment.
Figure 3B:
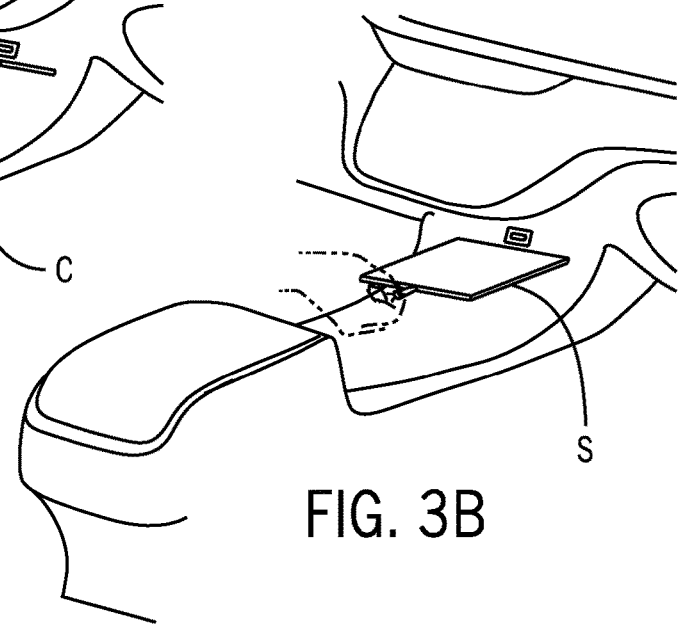
Figure 3C:
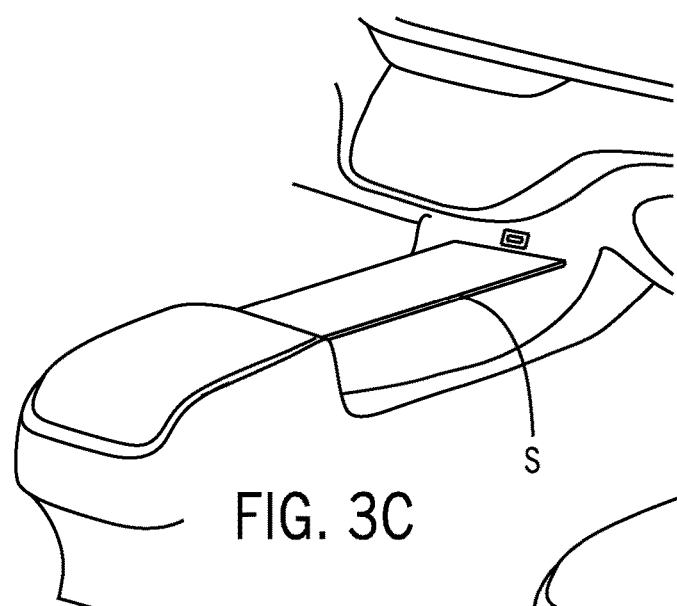
Figure 3D:
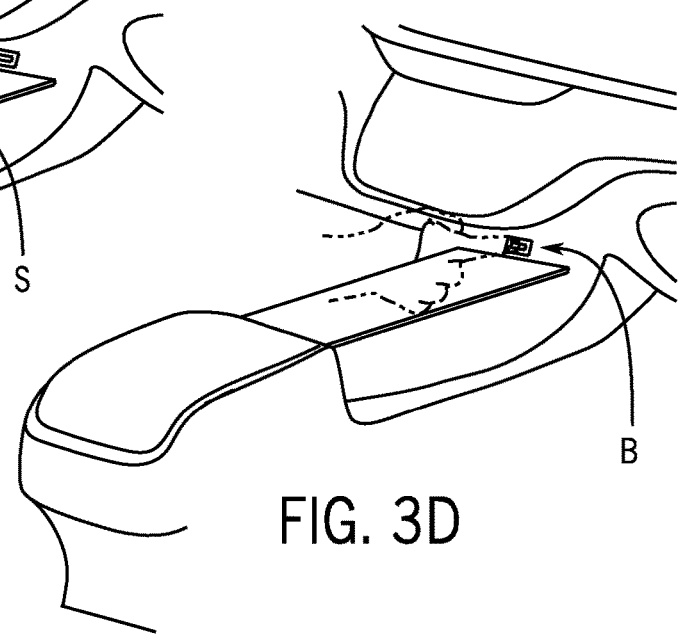
Figure 4:
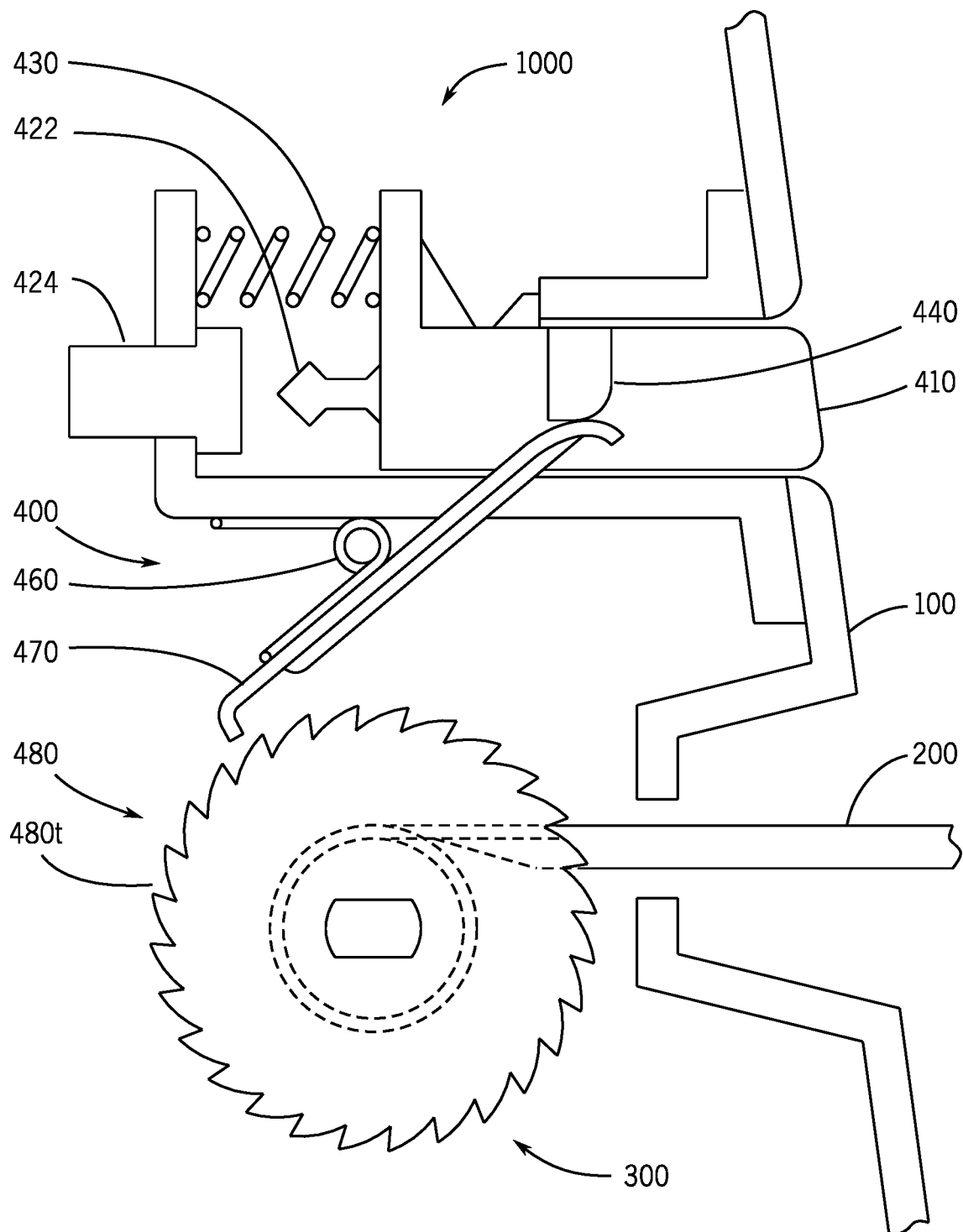
FIG. 4 is a schematic partial section view of a vehicle component according to an exemplary embodiment.
Figure 5A:
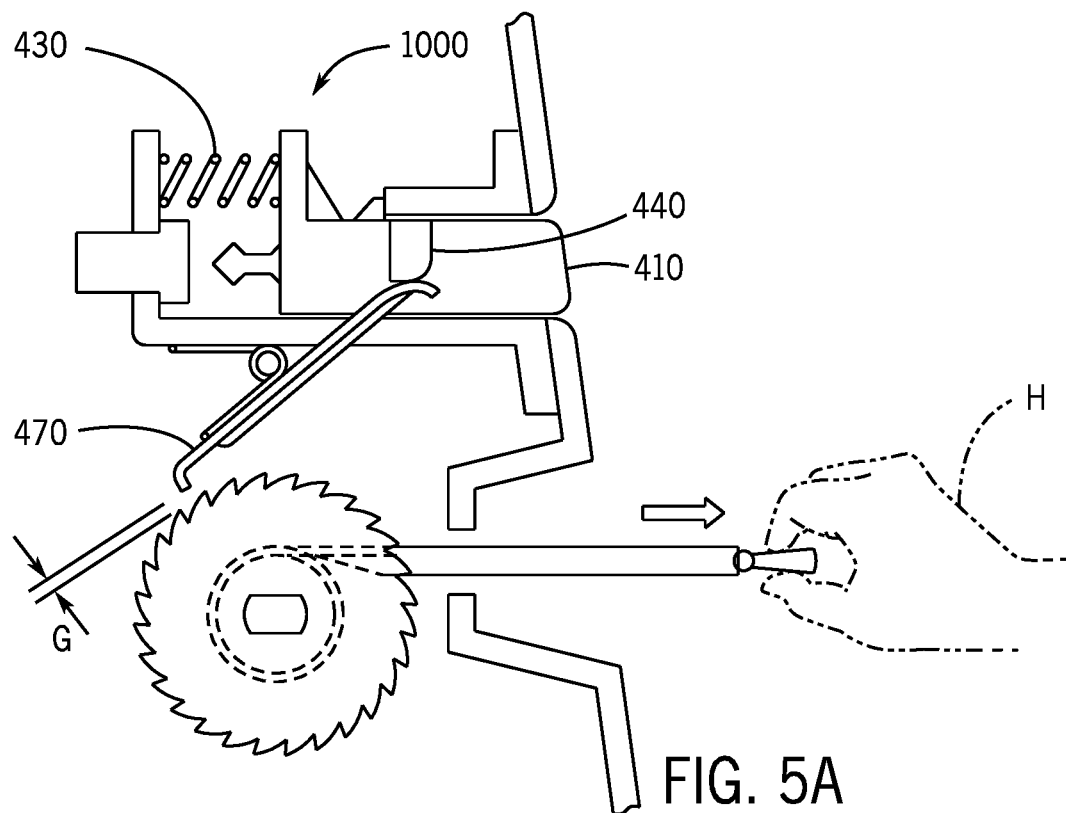
FIGS. 5A and 5B are schematic partial section views of a vehicle component according to an exemplary embodiment.
Figure 5B:
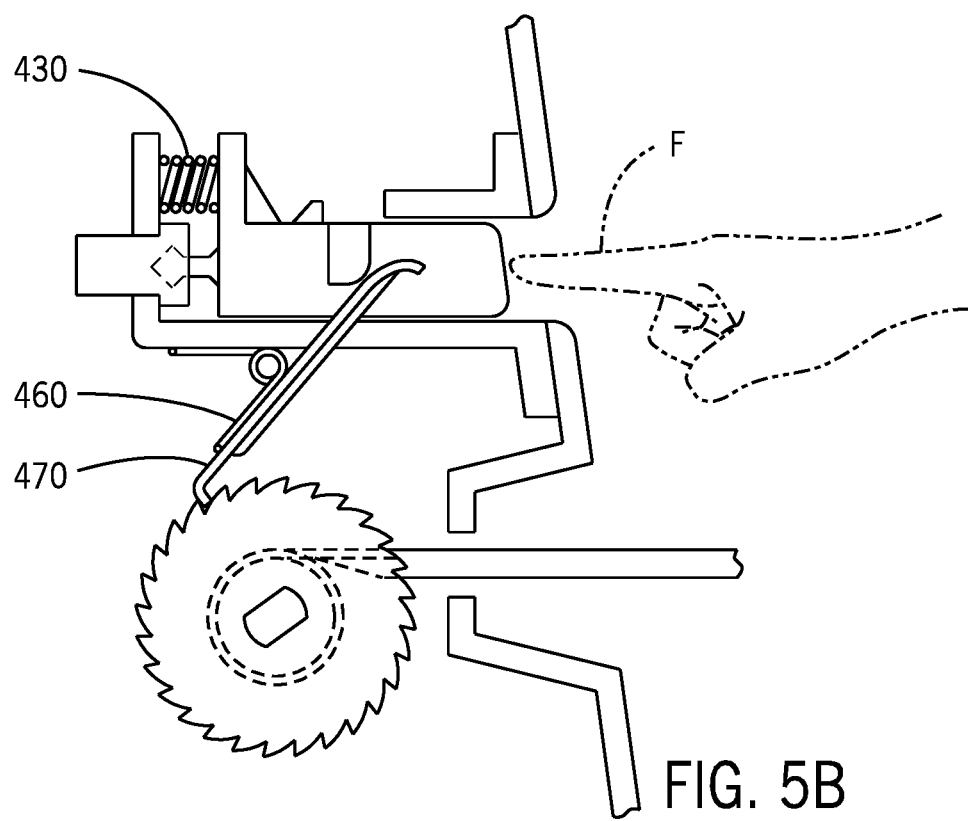
Figure 7A:
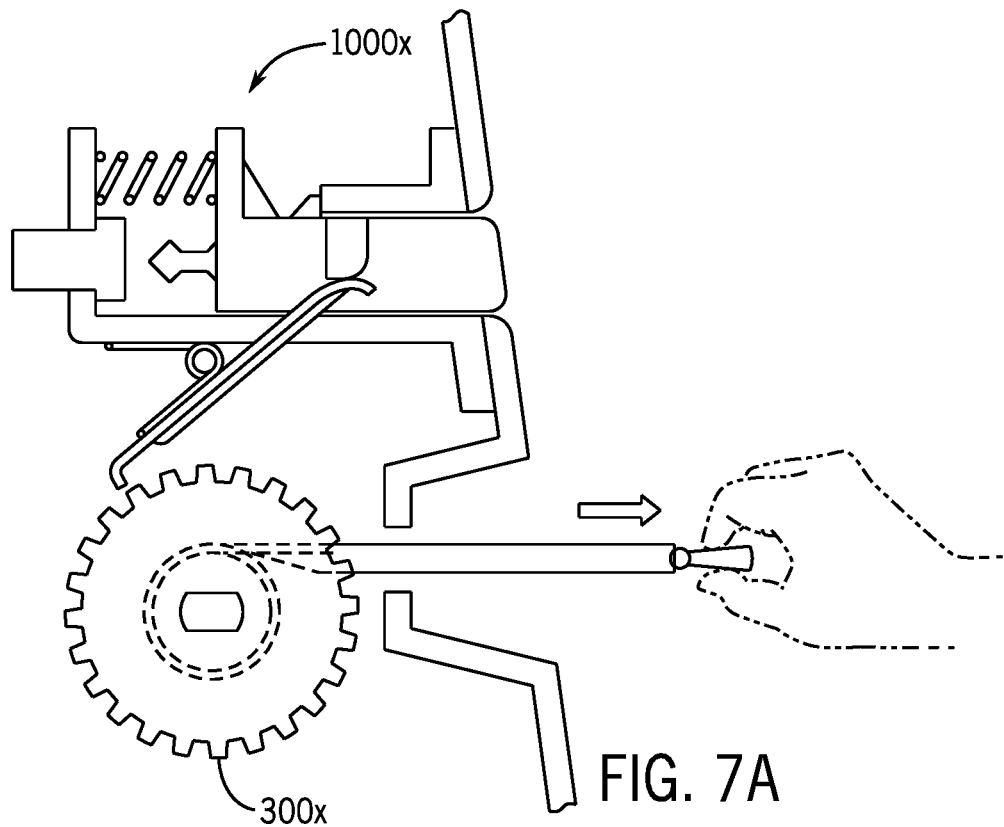
FIGS. 7A and 7B are schematic partial section views of a vehicle component according to an exemplary embodiment.
Figure 7B:
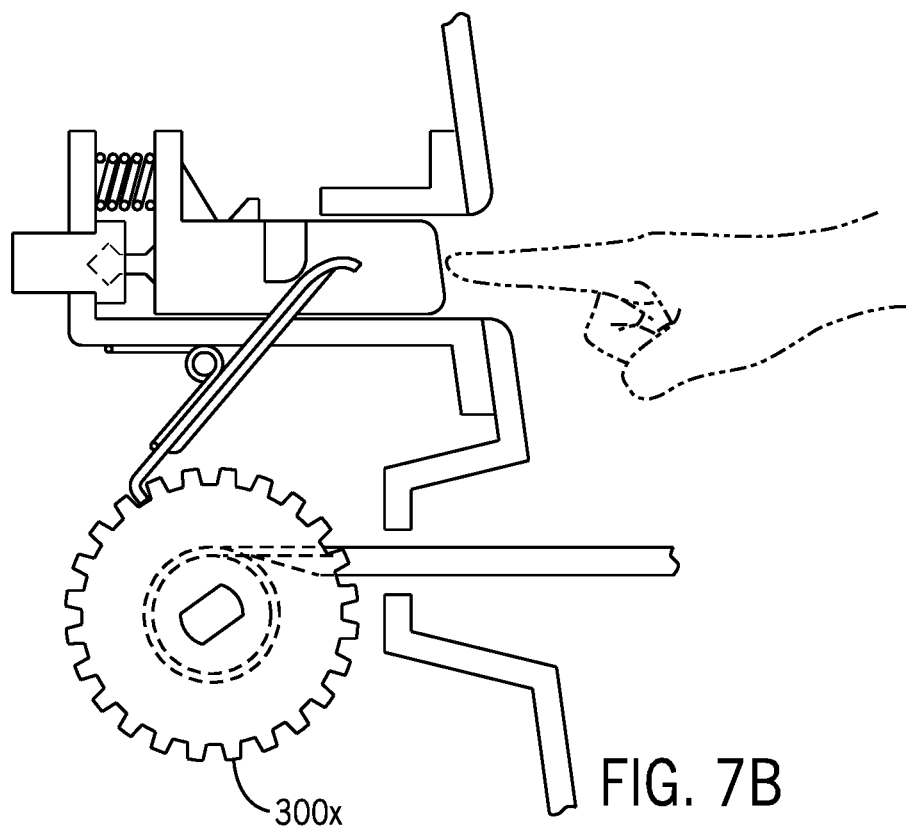
Figure 8A:
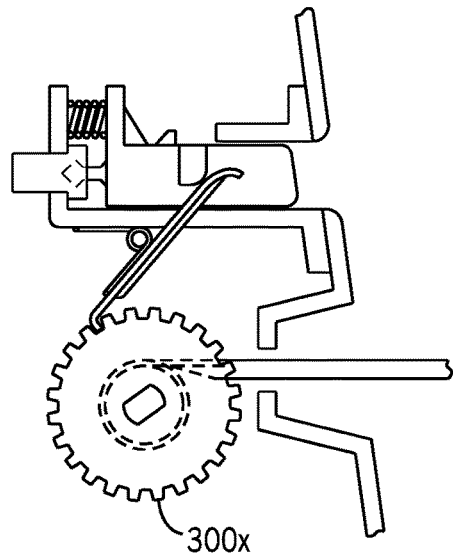
FIGS. 8A through 8D are schematic partial section views of a vehicle component according to an exemplary embodiment.
Figure 8B:
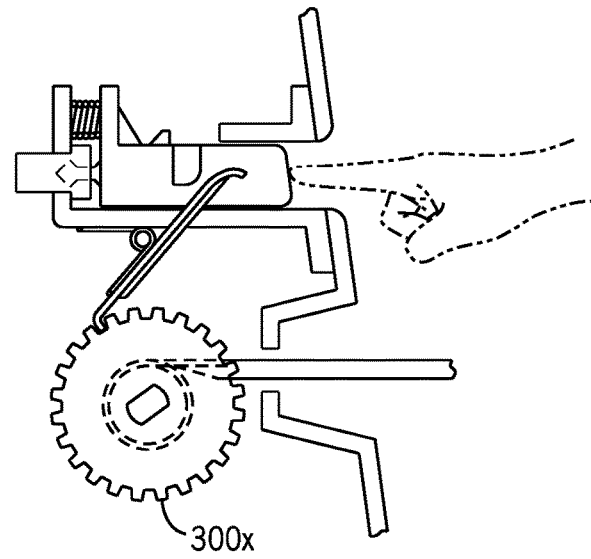
Figure 8C:
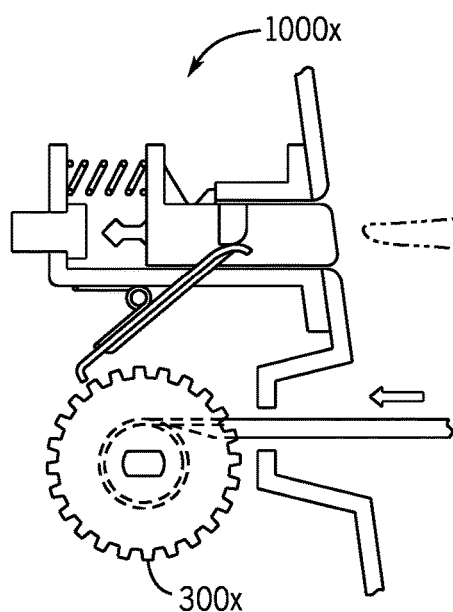
Figure 8D:
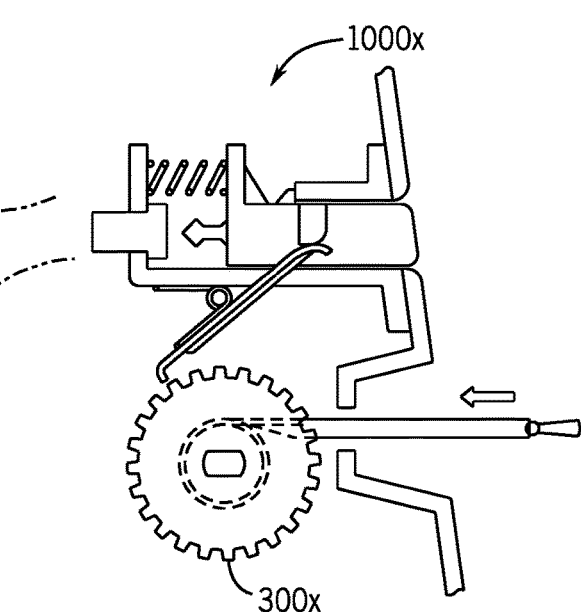

According to an exemplary embodiment as schematically in FIGS. 1A-1B, a vehicle V may comprise an interior I including one or more door panels DP, one or more floor consoles FC and one or more seats ST.

According to an exemplary embodiment as shown schematically in FIGS. 2A-2E, 3A-3D, 4, 5A-5B, 6, 7A-7B, 8A-8D and 9, a component C/1000/1000x for a vehicle may comprise: a base 100; a roller 300/300x configured to rotate relative to the base; a sheet 200 coupled to the roller and configured to move between a retracted state and an extended state; and a lock mechanism 400. The lock mechanism may be configured for a disengaged state to allow movement of the sheet and an engaged state to block movement of the sheet. The component may comprise a button B/410; the button may be configured to move between a default position and an actuated position. The button may be configured to move the lock mechanism to the engaged state to block movement of the sheet. The lock mechanism may comprise a latch 422; the latch may be configured to hold the button in the actuated position. The component may comprise a spring 430; the spring may be configured to move the button toward the default position. The component may comprise a spring 430; the spring may be configured to bias the button in default position. Spring 430 may comprise a compression spring. The roller may comprise a set of teeth 480t; the lock mechanism may comprise an arm 470. The arm may be configured to engage the set of teeth to hold the sheet in the extended state. The component may comprise a button 410 configured to engage the arm to provide a gap between the arm and the set of teeth. The button may comprise a latch 422 configured to hold the button in an actuated position to prevent engagement of the button with the arm. The set of teeth may be configured to prevent movement of the sheet toward the extended state. The lock mechanism may comprise a spring 460 configured to bias the arm to engage the set of teeth to hold the sheet in the extended state. Spring 460 may comprise a torsion spring. The component may comprise a tab 440 configured to compress spring 460. The component may comprise a tab 440 configured to hold the arm and provide a gap between the arm and the set of teeth. The lock mechanism may comprise a first spring 430, a tab 440, a second spring 460 and a latch 422. The first spring may be configured to move the tab to engage the arm and move the arm out of engagement with the set of teeth. The second spring may be configured to move the arm to engage the set of teeth in response to compression of the first spring. The latch may be configured to hold the first spring in a compressed state to allow the second spring to hold the arm in engagement with the set of teeth. The component may comprise a spring configured to move the sheet from the extended state toward the retracted state. The roller may comprise at least one of (a) a spool; (b) a reel; (c) a tube; (d) a cylinder; (e) a wheel. The sheet may comprise at least one of (a) a fabric (b) a panel; (c) a textile; (d) a woven fabric; (e) a nylon material; (f) a mesh; (g) a polymer film laminated to a fabric; (h) a moisture resistant material. The sheet may comprise at least one of (a) a bar; (b) an opening; (c) a pin; (d) a wire; (e) a tab; (f) a closure configured to engage at least one of (1) a console; (2) a door; (3) a seat; (4) an armrest to hold the sheet in the extended position. The component may comprise at least one of (a) a tonneau cover; (b) a cargo cover; (c) a retractable table. According to an exemplary embodiment as shown schematically in FIGS. 2A-2D, 3A-3D, 7A-7B, 8A-8D and 9, the set of teeth of roller 300x may be configured to prevent movement of the sheet toward the extended state and the retracted state.

According to an exemplary embodiment as shown schematically in FIGS. 10A-10D, 11A-11D, 12A-12C and 13, a component 2000 for a vehicle may comprise a base; a roller configured to rotate relative to the base; a sheet coupled to the roller and configured to move between a retracted state and an extended state; and a latch/lock mechanism 500. The lock mechanism may be configured for a disengaged state to allow movement of the sheet and an engaged state to block movement of the sheet. The roller may comprise at least one of (a) a spool; a reel; (c) a tube; (d) a cylinder; (e) a wheel. The sheet may comprise at least one of (a) a fabric a panel; (c) a textile; (d) a woven fabric; (e) a nylon material; (f) a mesh; (g) a polymer film laminated to a fabric; (h) a moisture resistant material. The sheet may comprise at least one of (a) a bar; an opening; (c) a pin; (d) a wire; (e) a tab; (f) a closure configured to engage at least one of (1) a console; (2) a door; (3) a seat; (4) an armrest to hold the sheet in the extended position. The component may comprise at least one of (a) a tonneau cover; (b) a cargo cover; (c) a retractable table According to an exemplary embodiment as shown schematically in FIGS. 10A-10D, 11A-11D, 12A-12C and 13, a component 2000 for a vehicle may comprise a base; a roller configured to rotate relative to the base; and a sheet 2200 coupled to the roller and configured to move between a retracted state and an extended state. The sheet may comprise a trailing edge coupled to the roller and a leading edge opposite the trailing edge. The sheet may comprise a latch/lock mechanism 500 at the leading edge of the sheet configured to engage at least one of (1) a console; (2) a door; (3) a seat; (4) an armrest to hold the sheet in the extended state. The sheet may be configured to move along a path between the retracted state and the extended state; the latch may be configured to engage the at least one of (1) a console; (2) a door; (3) a seat; (4) an armrest in a direction generally orthogonal to the path. The roller may be configured to move the sheet from the extended state to a tensioned state in response to engagement of the latch. The component may comprise a sensor; the sensor may be configured to send a signal to rotate the roller to provide tension in the sheet in response to engagement of the latch. The component may comprise a motor; the motor may be configured to rotate the roller to provide tension in the sheet in response to engagement of the latch. The motor may be configured to rotate the roller to move the sheet toward the retracted state in response to disengagement of the latch.

According to an exemplary embodiment as shown schematically in FIGS. 10A-10D, 11A-11D, 12A-12C and 13, a component 2000 for a vehicle may comprise a base; a roller configured to rotate relative to the base; and a sheet 2200 coupled to the roller and configured to move between a retracted state and an extended state. The roller may be configured to rotate to provide tension in the sheet in response to movement of the sheet to the extended state. The component may comprise at least one of (a) a sensor; (b) a motor; the at least one of the sensor; the motor may be configured to rotate the roller to move the sheet from the extended state to a tensioned state.

According to an exemplary embodiment as shown schematically in FIGS. 14A-14D, 15A-15D, 16A-16D, 17A-17D and 18, a component 3000 for a vehicle may comprise a base; a roller configured to rotate relative to the base; a sheet 3300 coupled to the roller and configured to move between a retracted state and an extended state; and a latch/lock mechanism 500. The lock mechanism may be configured for a disengaged state to allow movement of the sheet and an engaged state to block movement of the sheet. The roller may comprise a set of teeth; the lock mechanism may comprise an arm. The arm may be configured to engage the set of teeth to hold the sheet in the extended state. The set of teeth may be configured to prevent movement of the sheet toward the extended state. The component may comprise a spring configured to move the sheet from the extended state toward the retracted state. The roller may comprise at least one of (a) a spool; (b) a reel; (c) a tube; (d) a cylinder; (e) a wheel. The sheet may comprise at least one of (a) a fabric (b) a panel; a textile; (d) a woven fabric; (e) a nylon material; (f) a mesh; (g) a polymer film laminated to a fabric; (h) a moisture resistant material. The sheet may comprise at least one of (a) a bar; (b) an opening; (c) a pin; (d) a wire; (e) a tab; (f) a closure configured to engage at least one of (1) a console; (2) a door; (3) a seat; (4) an armrest to hold the sheet in the extended position. The component may comprise at least one of (a) a tonneau cover; (b) a cargo cover; (c) a retractable table. The component may comprise an actuator 600; the actuator may be configured to move between a default position and an actuated position. The actuator may be configured to move the lock mechanism to the engaged state to block movement of the sheet. The actuator may be configured to move the sheet from the extended state to a tensioned state in response to movement of the sheet to the extended state. The actuator may be configured to rotate the roller to provide tension in the sheet in the extended state. The component may comprise a sensor; the sensor may be configured to send a signal to move the actuator between the default position and the actuated position. The actuator may comprise a linear actuator.

According to an exemplary embodiment as shown schematically in FIGS. 14A-14D, 15A-15D, 16A-16D, 17A-17D and 18, a component 3000 for a vehicle may comprise a base; a roller configured to rotate relative to the base; and a sheet 3200 coupled to the roller and configured to move between a retracted state and an extended state. The sheet may comprise a trailing edge coupled to the roller and a leading edge opposite the trailing edge. The sheet may comprise a latch/lock mechanism 500 at the leading edge of the sheet configured to engage at least one of (1) a console; (2) a door; (3) a seat; (4) an armrest to hold the sheet in the extended state. The sheet may be configured to move along a path between the retracted state and the extended state; the latch may be configured to engage the at least one of (1) a console; (2) a door; (3) a seat; (4) an armrest in a direction generally orthogonal to the path. The roller may be configured to move the sheet from the extended state to a tensioned state in response to engagement of the latch. The component may comprise a sensor; the sensor may be configured to send a signal to rotate the roller to provide tension in the sheet in response to engagement of the latch.

According to an exemplary embodiment as shown schematically in FIGS. 14A-14D, 15A-15D, 16A-16D, 17A-17D and 18, a component 3000 for a vehicle may comprise a base; a roller configured to rotate relative to the base; and a sheet 3200 coupled to the roller and configured to move between a retracted state and an extended state. The roller may be configured to rotate to provide tension in the sheet in response to movement of the sheet to the extended state. The component may comprise at least one of (a) an actuator 600; (b) a sensor; the at least one of the actuator; the sensor may be configured to rotate the roller to move the sheet from the extended state to a tensioned state.

As indicated schematically in FIG. 8, operation of a vehicle component may comprise the steps of moving a sheet from a retracted state to an extended state with a lock mechanism disengaged; holding the sheet held in the extended state; moving the lock mechanism from a disengaged state to an engaged state to block movement of the sheet; disengaging the lock mechanism; a roller moving the sheet toward the retracted state.

Figure 9:
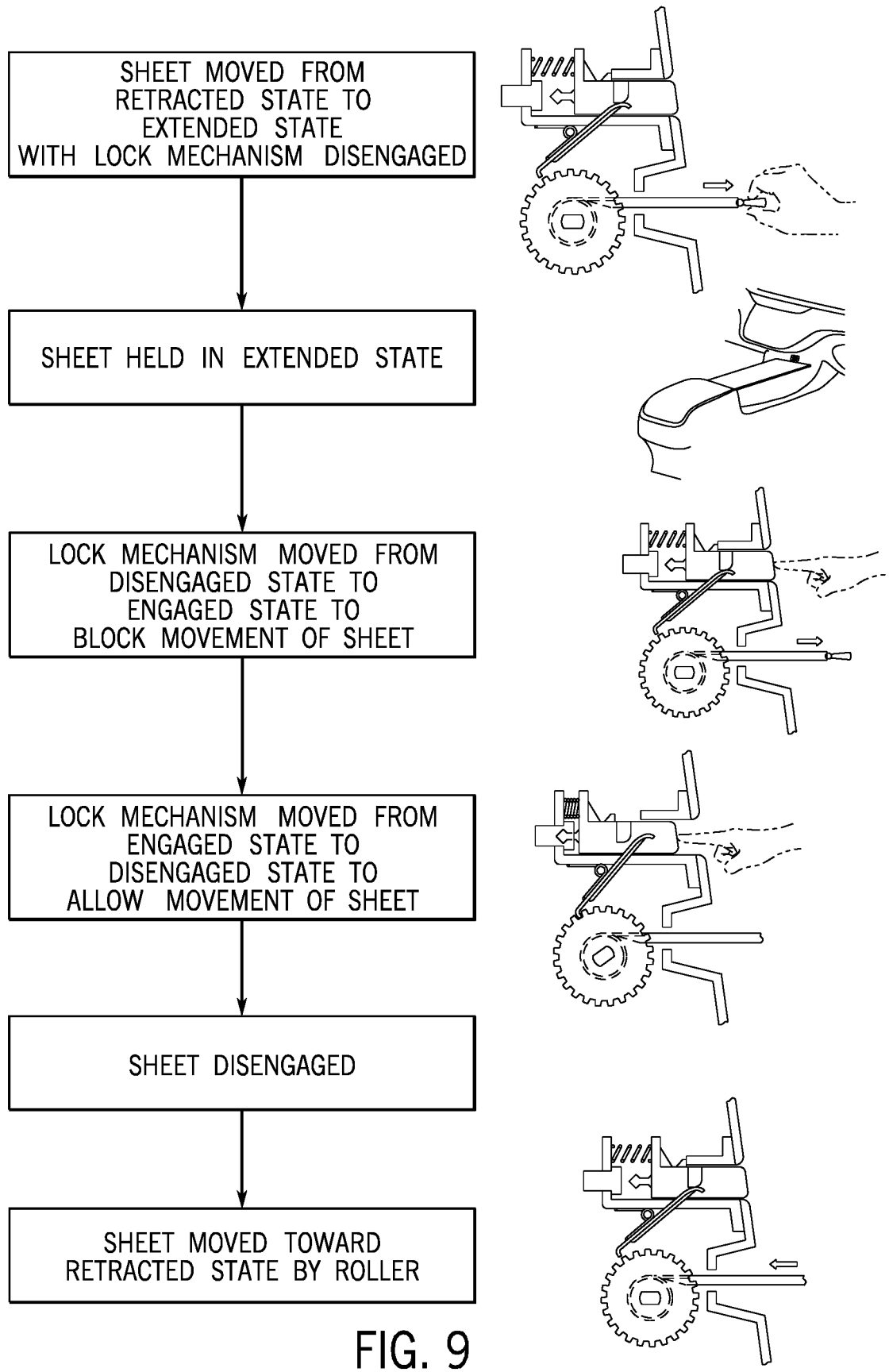
FIG. 9 is a schematic diagram of operation of a vehicle component according to an exemplary embodiment.
Figure 10A:
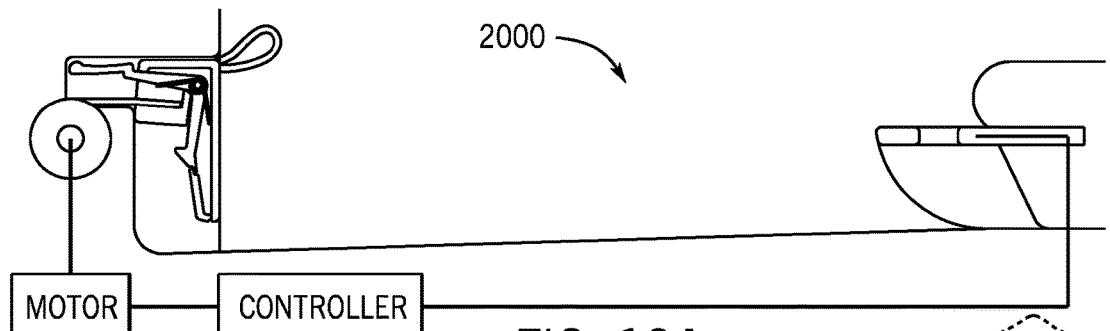
FIGS. 10A through 10D are schematic partial section views of a vehicle component according to an exemplary embodiment.
Figure 10B:
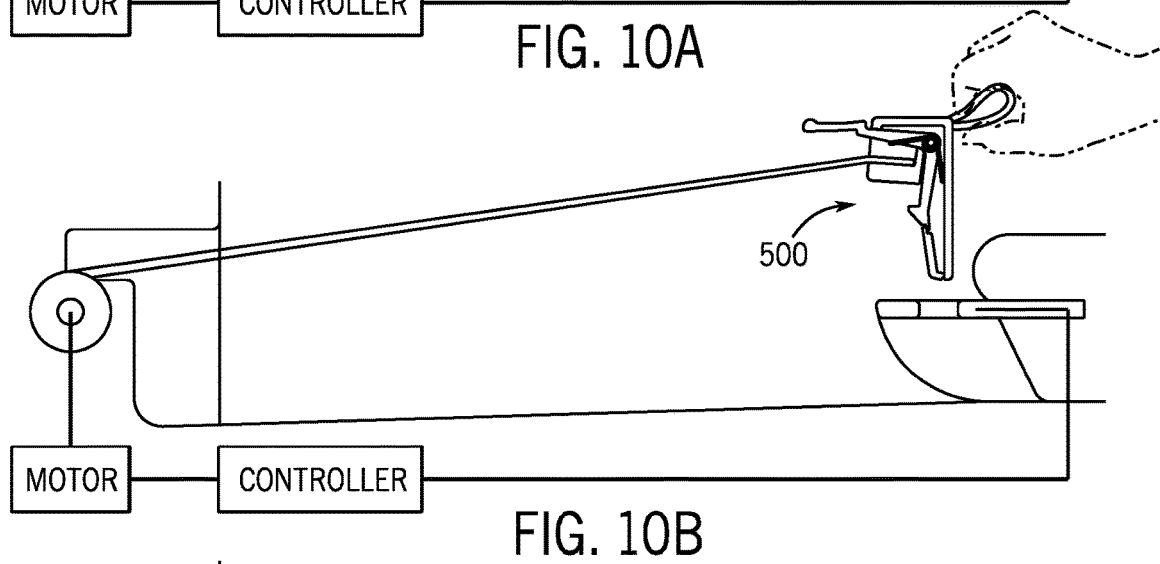
Figure 10C:
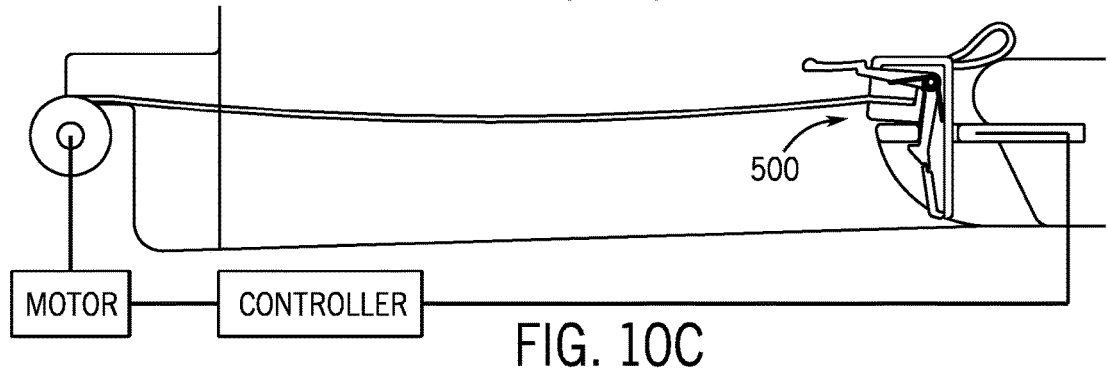
Figure 10D:
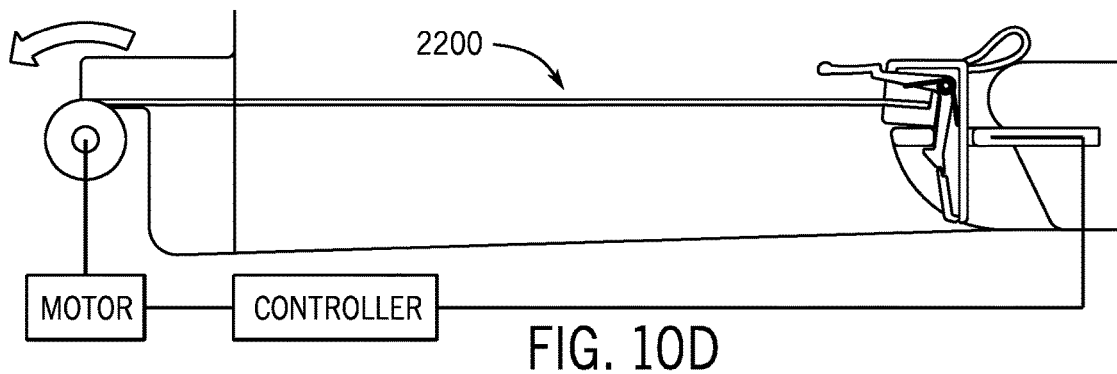
Figure 11A:
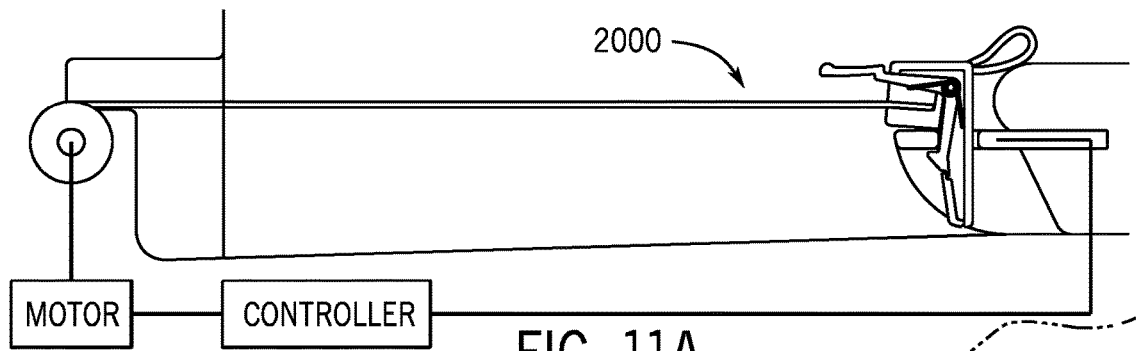
FIGS. 11A through 11D are schematic partial section views of a vehicle component according to an exemplary embodiment.
Figure 11B:
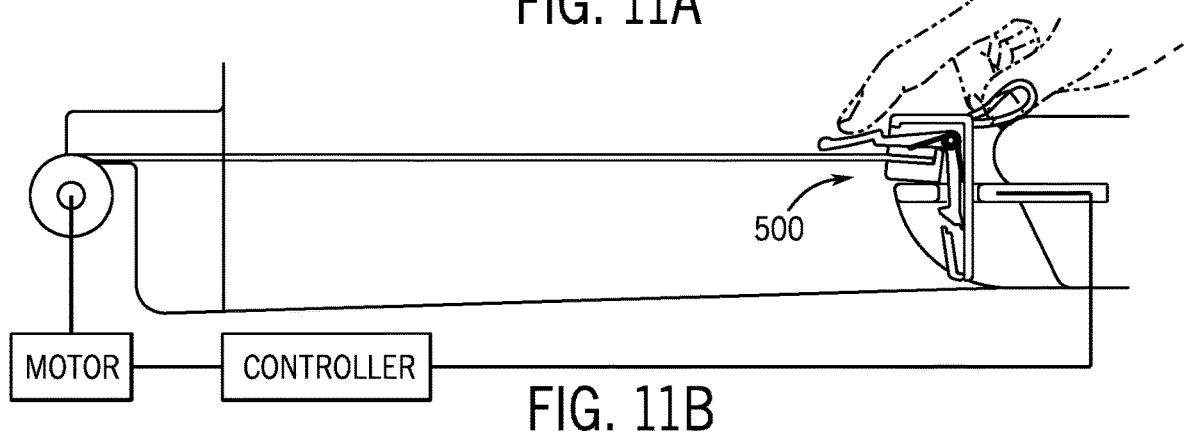
Figure 11C:
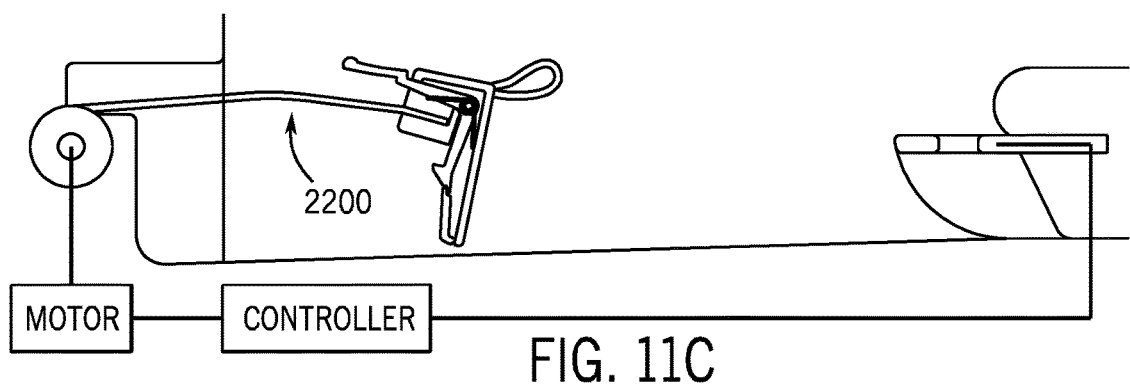
Figure 11D:
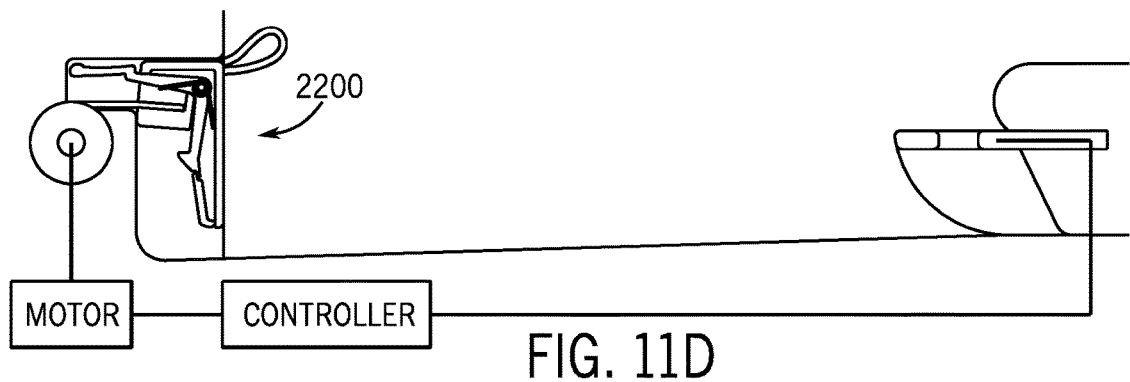
Figure 12A:
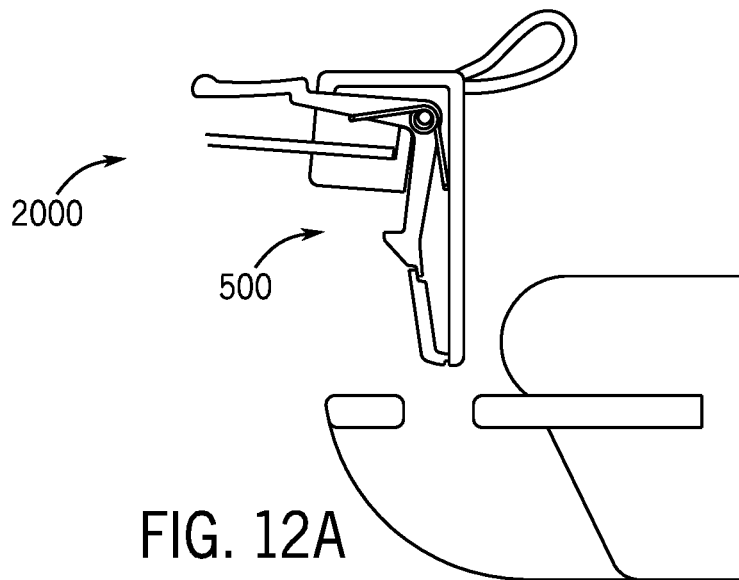
FIGS. 12A through 12C are schematic partial section views of a vehicle component according to an exemplary embodiment.
Figure 12B:
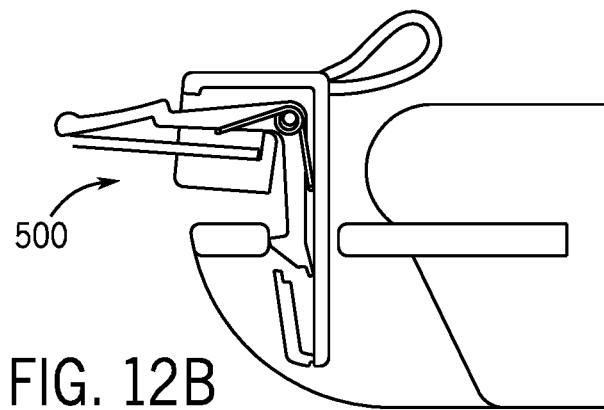
Figure 12C:
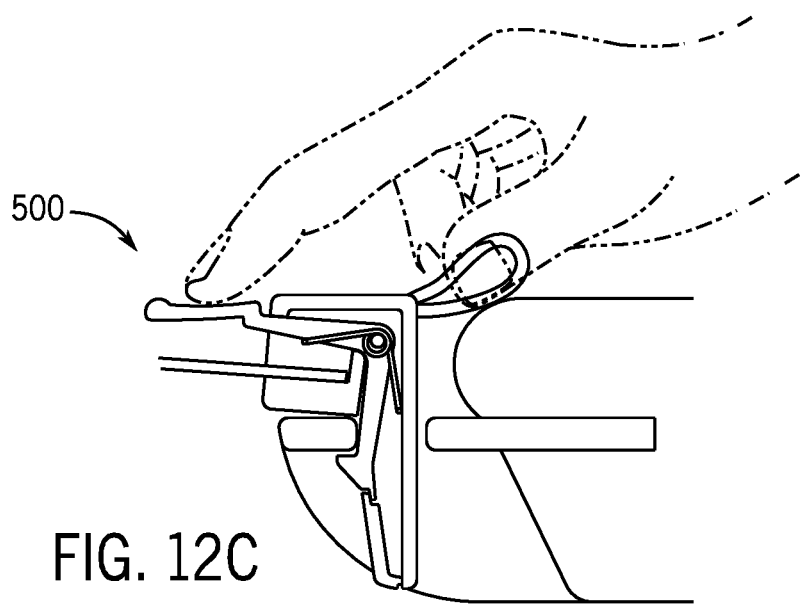

As indicated schematically in FIG. 9, operation of a vehicle component may comprise the steps of moving a sheet from a retracted state to an extended state with a lock mechanism disengaged; holding the sheet in the extended state; moving the lock mechanism to an engaged state to block movement of the sheet; moving the lock mechanism from the engaged state to the disengaged state to allow movement of the sheet; a roller moving the sheet to the retracted state.

Figure 13:
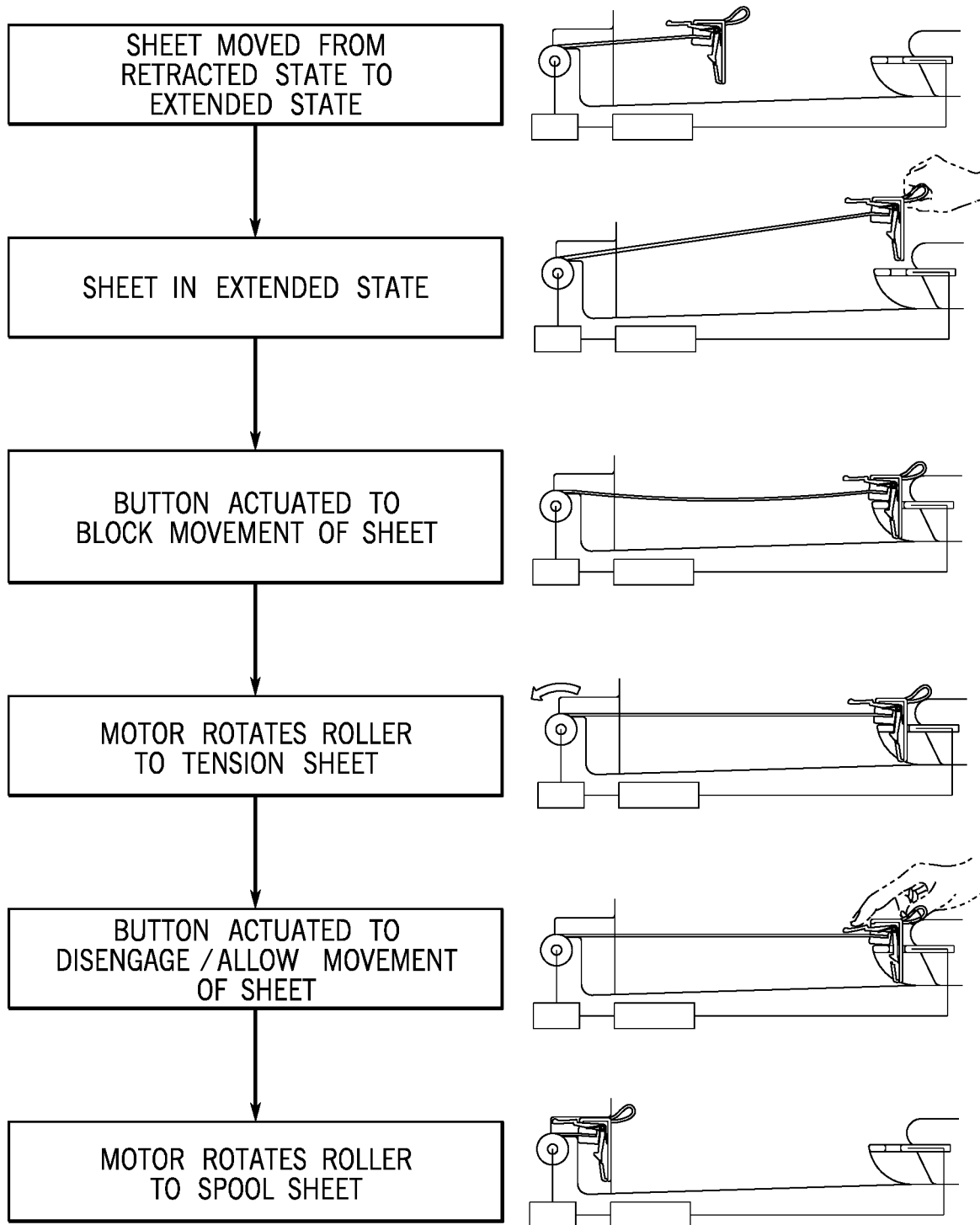
FIG. 13 is a schematic diagram of operation of a vehicle component according to an exemplary embodiment.
Figure 14A:
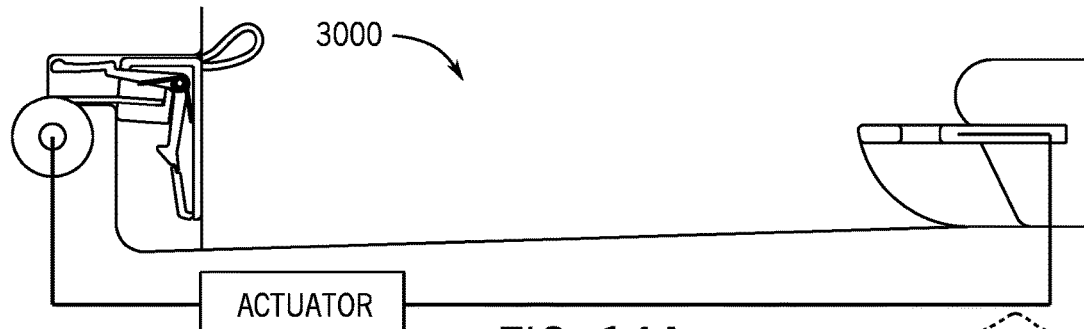
FIGS. 14A through 14D are schematic partial section views of a vehicle component according to an exemplary embodiment.
Figure 14B:
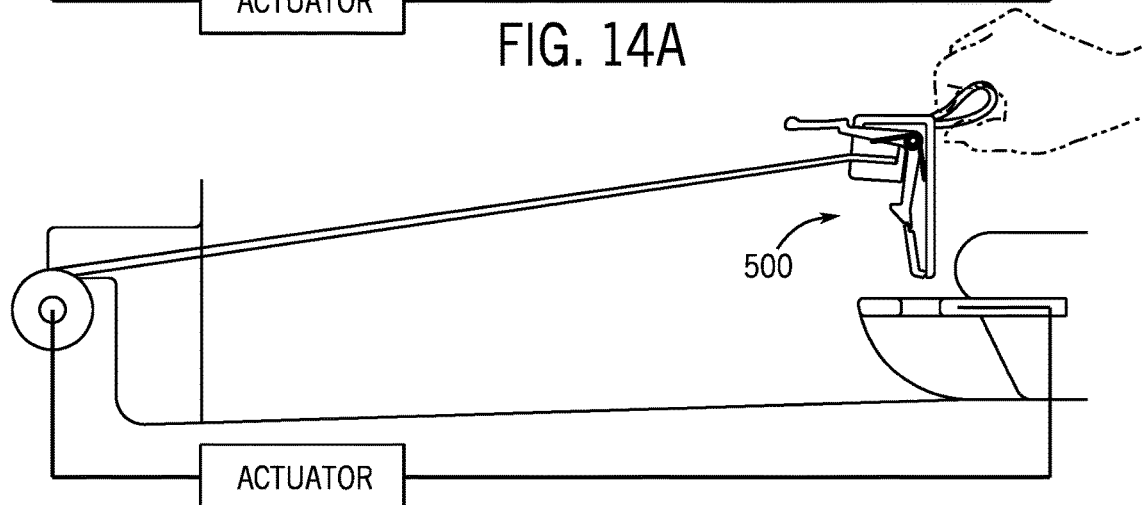
Figure 14C:
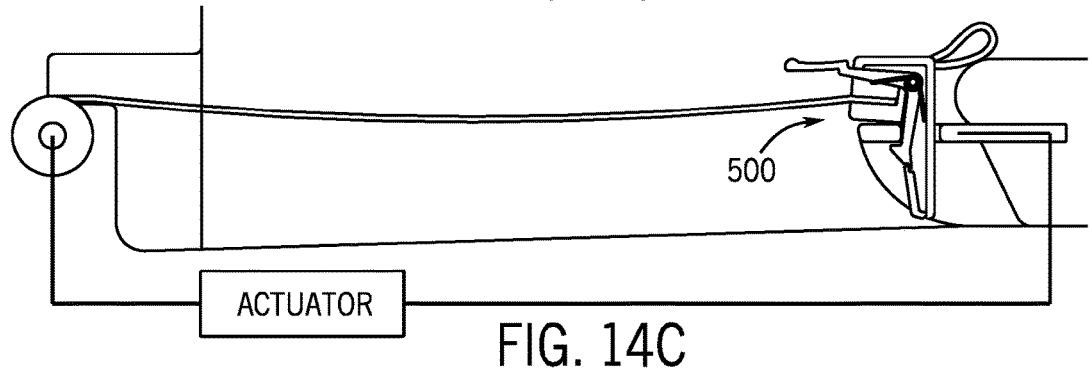
Figure 14D:
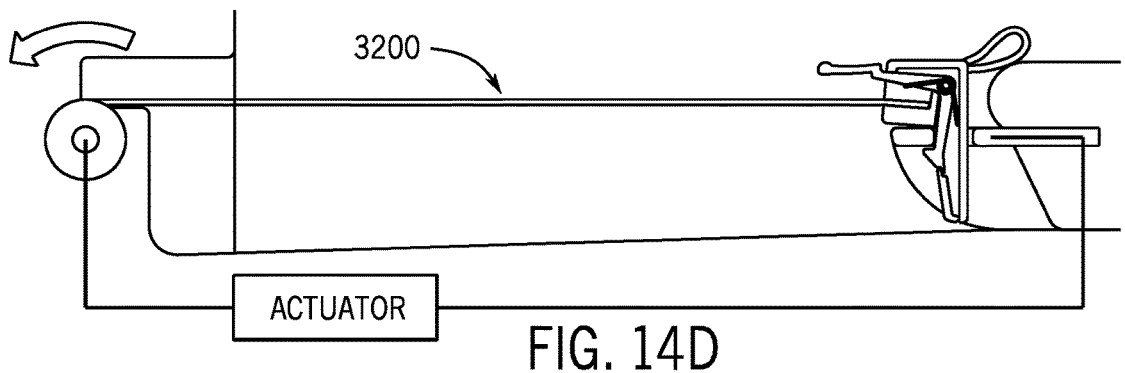
Figure 15A:
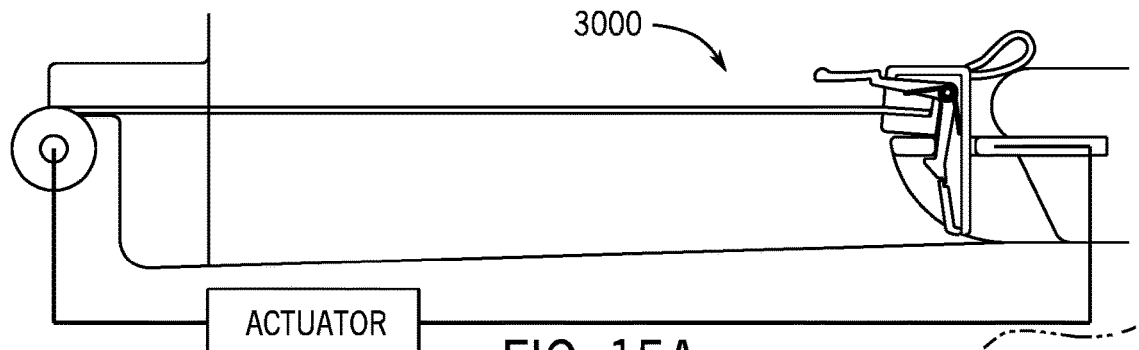
FIGS. 15A through 15D are schematic partial section views of a vehicle component according to an exemplary embodiment.
Figure 15B:
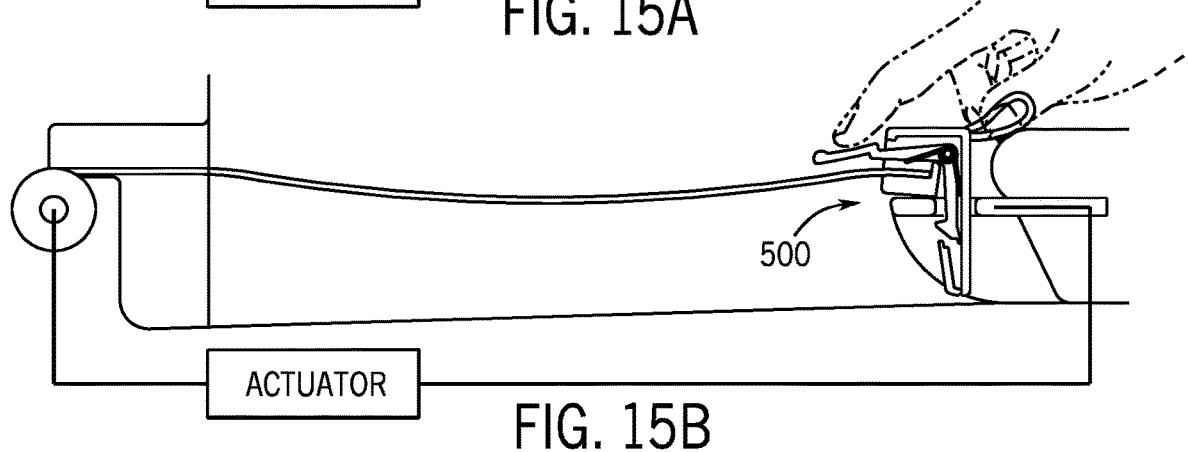
Figure 15C:
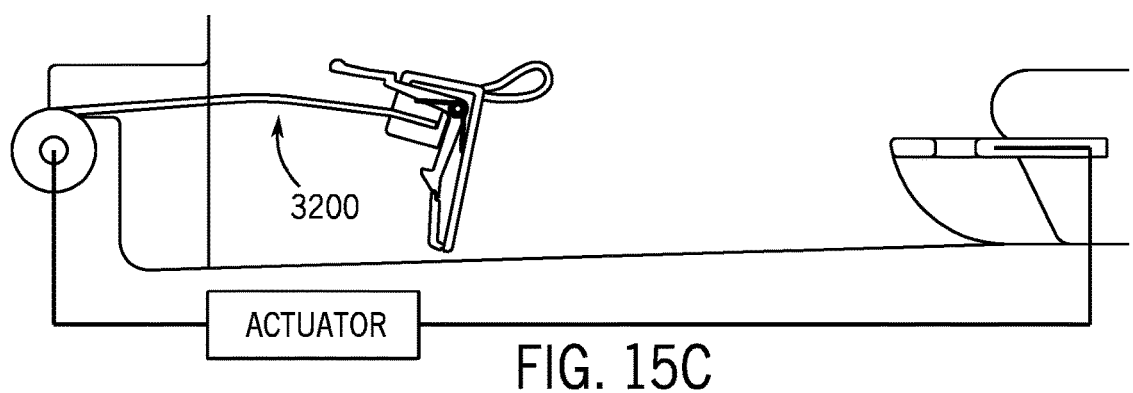
Figure 15D:
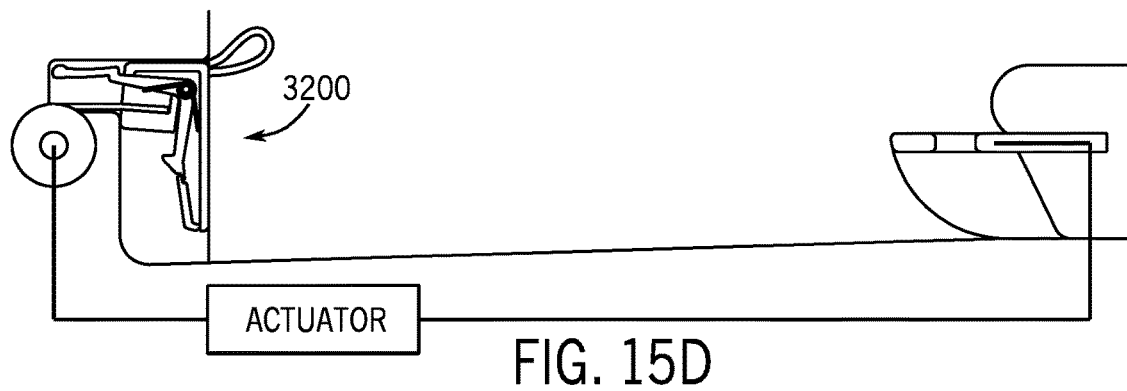
Figure 17A:
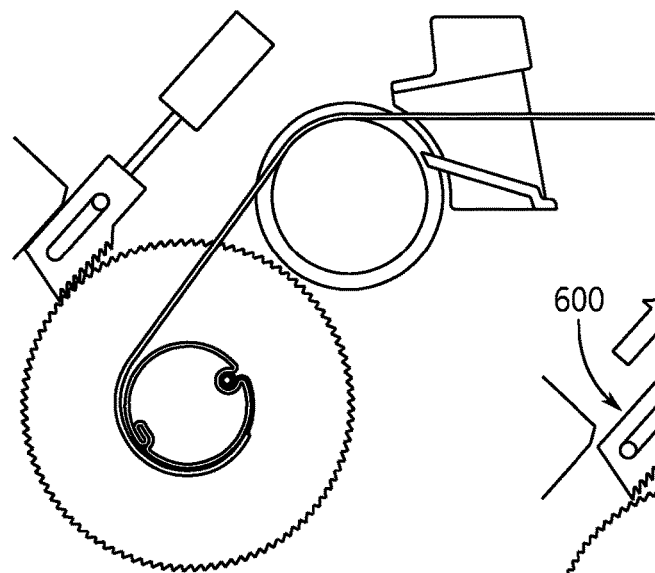
FIGS. 17A through 17D are schematic partial section views of a vehicle component according to an exemplary embodiment.
Figure 17B:
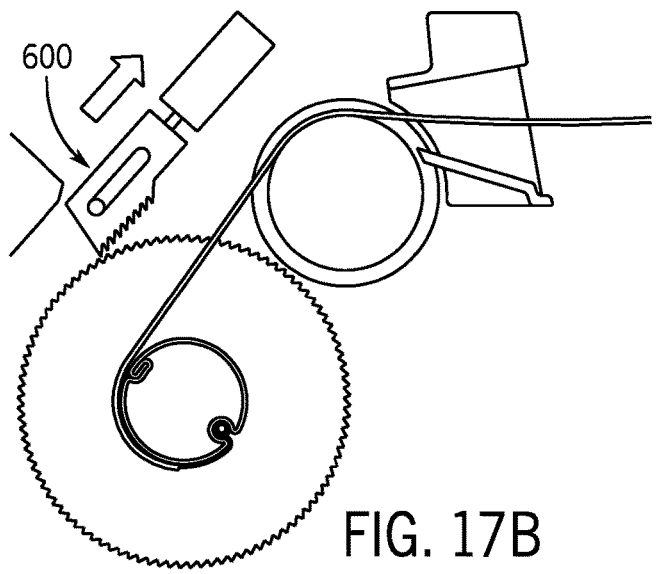
Figure 17C:
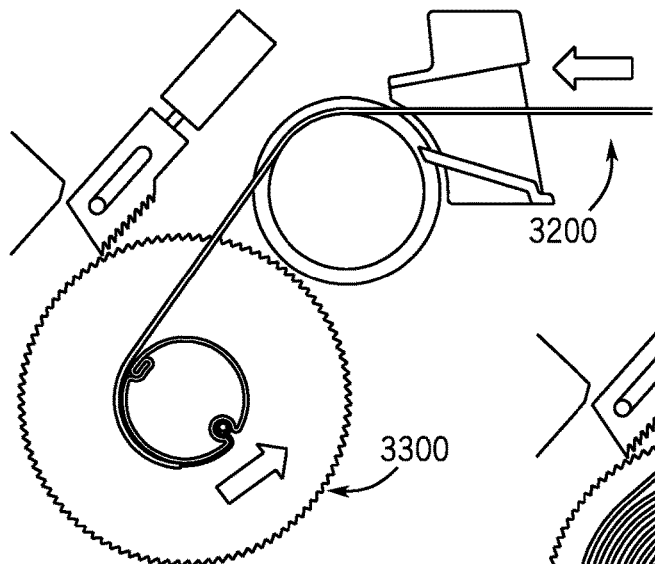
Figure 17D:
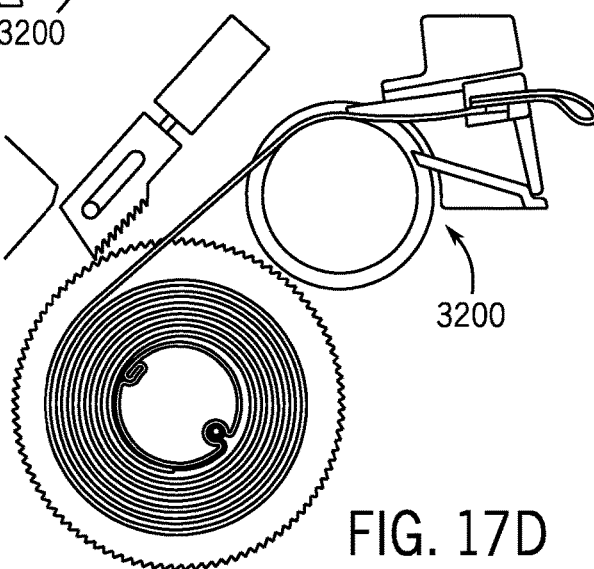

As indicated schematically in FIG. 13, operation of a vehicle component may comprise the steps of moving a sheet moved from a retracted state to an extended state; actuating a button to block movement of the sheet; a motor rotating a roller to tension the sheet; actuating the button to disengage/allow movement of the sheet; the motor rotating the roller to spool the sheet.

Figure 18:
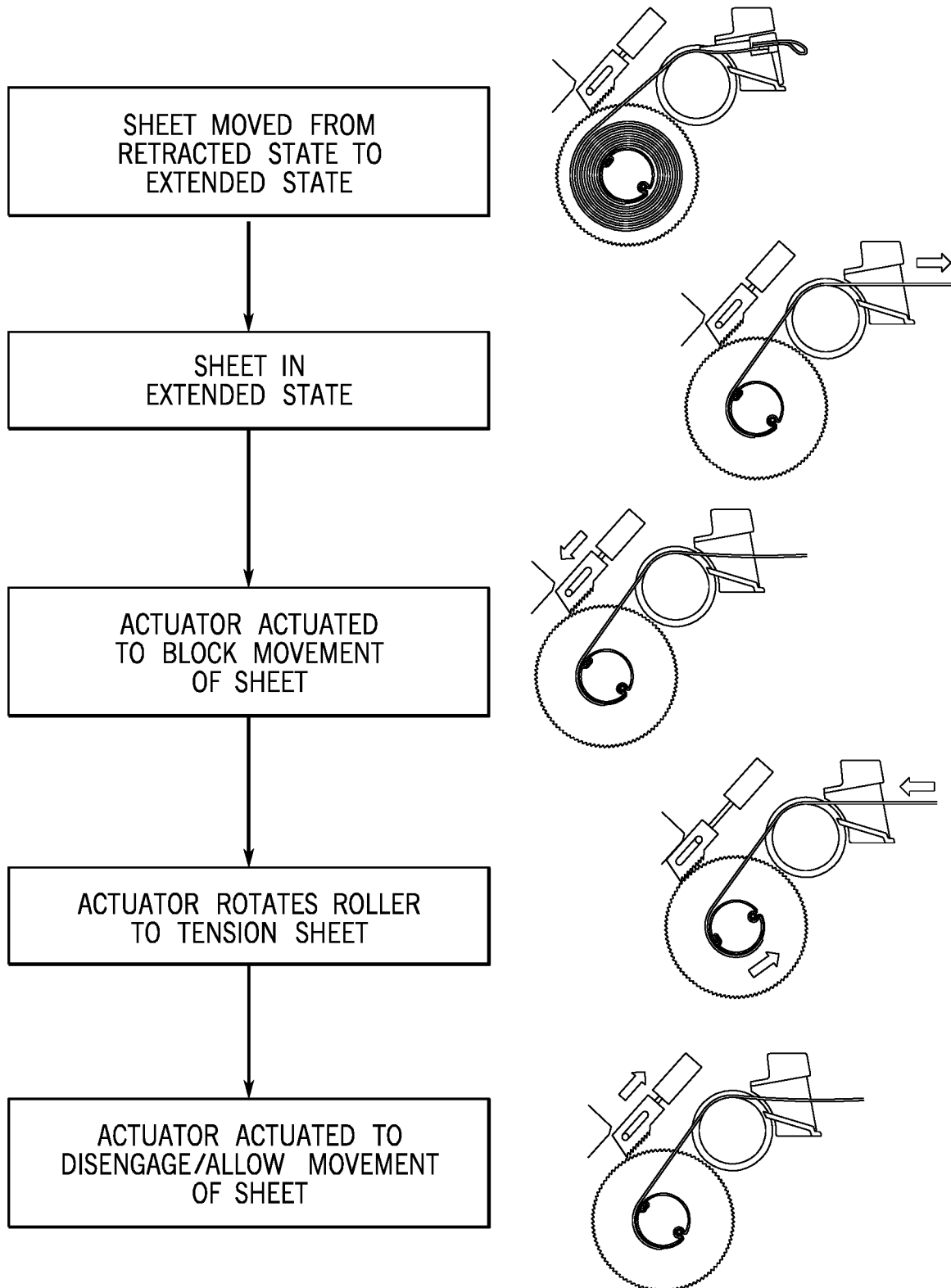
FIG. 18 is a schematic diagram of operation of a vehicle component according to an exemplary embodiment.
Figure 19A:
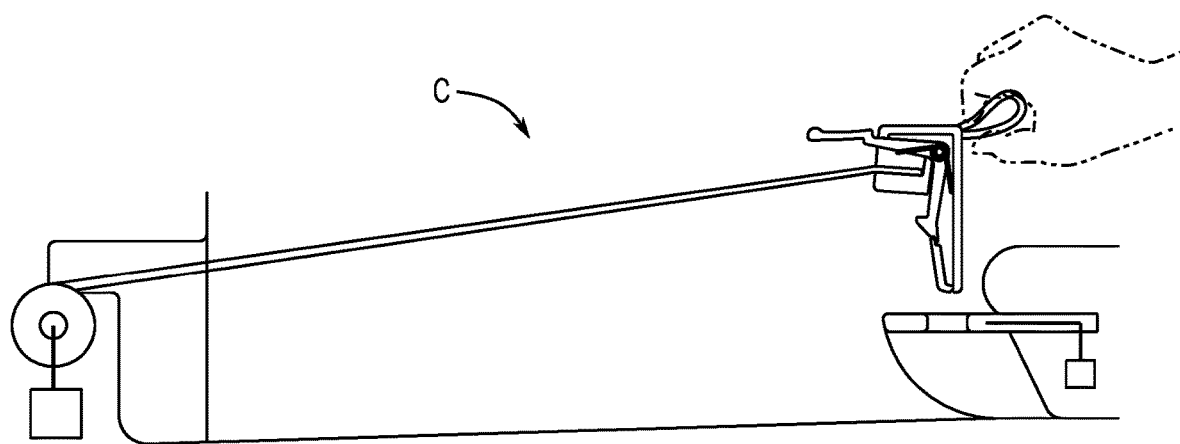
FIGS. 19A through 19D are schematic partial section views of a vehicle component according to an exemplary embodiment.
Figure 19B:
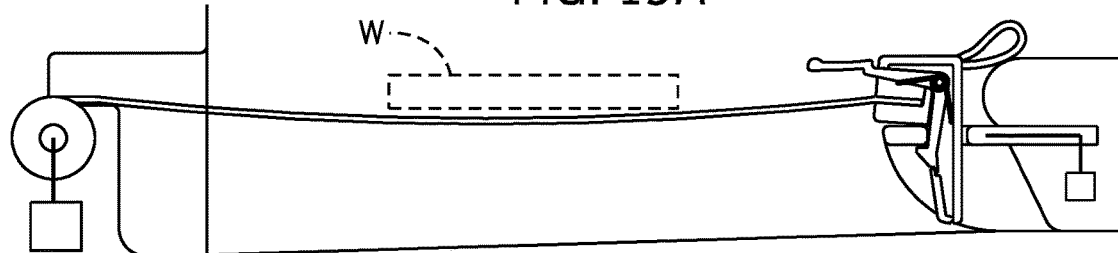
Figure 19C:
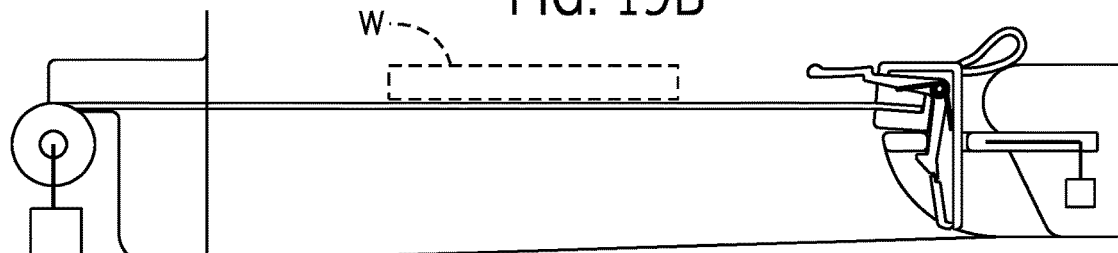
Figure 19D:
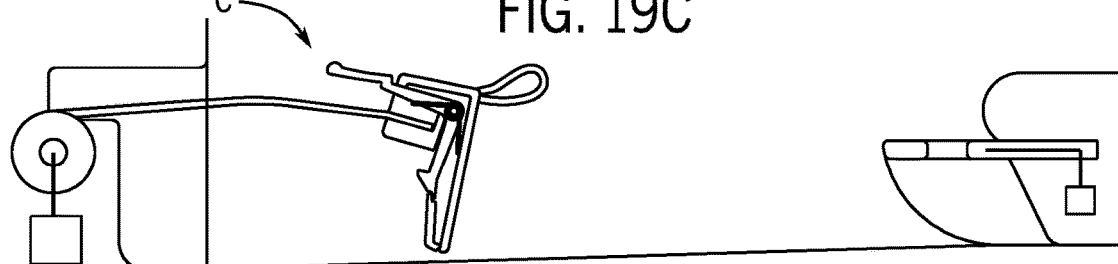

As indicated schematically in FIG. 18, operation of a vehicle component may comprise the steps of moving a sheet moved from a retracted state to an extended state; actuating an actuator to block movement of the sheet; the actuator rotating a roller to tension the sheet; actuating the actuator to disengage/allow movement of the sheet.

Exemplary Embodiments—A

According to an exemplary embodiment as shown schematically in FIGS. 2A-2E, 3A-3D, 4, 5A, 5B, 7A and 7B, a component C/1000/1000x for a vehicle may comprise a base 100, a roller 300/300x configured to rotate relative to base 100, a sheet S/200 coupled to roller 300/300x and configured to move between a retracted state (as shown schematically in FIG. 3A) and an extended state (as shown schematically in FIGS. 2A-2E and 3B-3D), and a lock mechanism 400. Lock mechanism 400 may be configured for a disengaged state (as shown schematically in FIGS. 4, 5A and 7A) to allow movement of sheet 200 and an engaged state (as shown schematically in FIGS. 3D, 5B and 7B) to block movement of sheet 200. Component C/1000/1000x may further comprise a button B/410; button 410 may be configured to move between a default position (as shown schematically in FIGS. 4, 5A and 7A) and an actuated position (as shown schematically in FIGS. 3D, 5B and 7B). Button 410 may be configured to move lock mechanism 400 to the engaged state to block movement of sheet 200. Lock mechanism 400 may comprise a latch 422; latch 422 may be configured to hold button 410 in the actuated position. Component 1000/1000x may further comprise a spring/first spring 430; spring 430 may be configured to move button 410 toward the default position. Component 1000/1000x may further comprise a spring/first spring 430; spring 430 may be configured to bias button 410 in the default position; spring 430 may comprise a compression spring. Roller 300/300x may comprise a set of teeth 480t; lock mechanism 400 may comprise an arm 470. Arm 470 may be configured to engage set of teeth 480t to hold sheet 200 in the extended state (as shown schematically in FIGS. 5B and 7B). Component 1000/1000x may further comprise a button 410 configured to engage arm 470 to provide a gap G between arm 470 and set of teeth 480t. Button 410 may comprise a latch 422 configured to hold button 410 in an actuated position to prevent engagement of button 410 with arm 470. Set of teeth 480t of roller 300 may be configured to prevent movement of sheet 200 toward the extended state. Set of teeth 480t of roller 300x may be configured to prevent movement of sheet 200 toward the extended state and the retracted state. Lock mechanism 400 may comprise a spring/second spring 460 configured to bias arm 470 to engage set of teeth 480t to hold sheet 200 in the extended state; spring 460 may comprise a torsion spring. Component 1000/1000x may further comprise a tab 440 configured to compress spring 460. Component 1000/1000x may further comprise a tab 440 configured to hold arm 470 and provide a gap G between arm 470 and set of teeth 480t. Lock mechanism 400 further may comprise a first spring 430, a tab 440, a second spring 460 and a latch 422. First spring 430 may be configured to move tab 440 to engage arm 470 and move arm 470 out of engagement with set of teeth 480t. Second spring 460 may be configured to move arm 470 to engage set of teeth 480t in response to compression of first spring 430. Latch 422 may be configured to hold first spring 430 in a compressed state to allow second spring 460 to hold arm 470 in engagement with set of teeth 480t. Component 1000/1000x may further comprise a spring configured to move sheet 200 from the extended state toward the retracted state. Roller 300/300x may comprise at least one of (a) a spool; (b) a reel; (c) a tube; (d) a cylinder; (e) a wheel. Sheet 200 may comprise at least one of (a) a fabric (b) a panel; (c) a textile; (d) a woven fabric; (e) a nylon material; (f) a mesh; (g) a polymer film laminated to a fabric; (h) a moisture resistant material. Sheet 200 may comprise at least one of (a) a bar; (b) an opening; (c) a pin; (d) a wire; (e) a tab 440; (f) a closure configured to engage at least one of (1) a console; (2) a door; (3) a seat; (4) an armrest to hold sheet 200 in the extended position. Component 1000/1000x may comprise at least one of (a) a tonneau cover; (b) a cargo cover; (c) a retractable table.

According to an exemplary embodiment, sheet 200 may comprise at least one of (a) a self-cleaning material; (b) a dust-repellant material; (c) an anti-skid material. According to an exemplary embodiment, a material of sheet 200 may comprise a product commercially available as a PVC Membrane from Pfeifer FabriTec of Memmingen, Germany and Dallas, Tex., USA or may comprise anti-dust plastic additives such as commercially available under the trade name IRGASTAT from BASF GmbH of Lamperheim, Germany (BASF Corp. of Florham Park, N.J., USA) or may comprise a foam or polyester anti-slip fabric such as commercially available from The Rubber Company of Hampshire, UK or as commercially available non-slip fabric type H4643 and/or H4644 from Heskins Ltd. of Lancashire, UK. According to an exemplary embodiment, a material of sheet 200 may comprise a surface treatment applied to provide at least one of (a) self-cleaning properties; (b) dust-repellency; (c) increased friction. According to an exemplary embodiment, the surface treatment applied to the material of sheet 200 may comprise a repellent coating for fabric of a type commercially available from Starshield Technologies Private Ltd. of Uttar Pradesh, India; a TEFLON textile finish such as commercially available from The Chemours Company of Wilmington, Del., USA may be applied to the sheet material as a treatment; a slip resistant coating/spray such as commercially available from No Skidding Products Inc. of Toronto, Ontario, Canada may be applied to the sheet material as a treatment.

As indicated schematically according to an exemplary embodiment, the flexible sheet material shown as sheet 200 may be configured to provide a surface/table rigidified by lock mechanism 400 for the vehicle component when in the extended position. See FIGS. 3D, 5B and 7B.

As indicated schematically in FIGS. 3A-3D, sheet 200 may be deployed from roller 300/300x as a flexible form/ sheet configured to rigidify into a rigid/semi-rigid frame/form to provide a surface for use. Actuation/depression of button 410 may engage lock mechanism 400 to provide rigidity to sheet 200 as indicated schematically in FIGS. 3D, 5B and 5B. Subsequent actuation/depression of button 410 may disengage lock mechanism 400 to provide a flexible form for sheet 200 to return to the stowed/retracted position on roller 300/300x.

Exemplary Embodiments—B

According to an exemplary embodiment as shown schematically in FIGS. 2A-2E, 3A-3D, 9, 10A-10D, 11A-11D, 12A-12C, 13, 14A-14D, 15A-15D, 18 and 19, a component C (also shown as component 2000/3000) for a vehicle/vehicle interior (V/I) may be configured for a base comprising an attachment point; the component may comprise a roller, a web shown as sheet S comprising a catch (shown as latch 500) configured to extend between the roller and the attachment point of the base, an actuator configured to operate the roller; the catch of the web may be configured to engage the attachment point of the base when the web is fully extended; the actuator may be configured to retract the web onto the roller when the catch of the web is disengaged from the attachment point of the base. See also FIGS. 10A-10D, 11A-11D, 13, 14A-14D, 15A-15D. The catch may comprise a latch. The actuator may be configured to tension the web when the catch of the web is engaged with the attachment point of the base. The actuator may be configured to retain tension in the web when the catch of the web is engaged with the attachment point of the base. The component may comprise a control configured to operate the actuator to retract the web onto the roller when the catch of the web is disengaged from the attachment point of the base. The attachment point may comprise a recess. The latch may comprise a clip configured to engage the attachment point. The clip may comprise a spring clip. The clip may be configured to engage the recess. The component may comprise a latch mechanism comprising the clip and a button configured to release the clip from the attachment point. The actuation system may comprise a controller. The controller may be coupled to the control. The control may comprise a release. The latch mechanism may comprise the release. The release may comprise a release button. The web may comprise a sheet. The web may comprise a retractable sheet. The web may comprise an extendable sheet configured to provide a surface when the latch of the web is engaged with the attachment point of the base.

According to an exemplary embodiment shown schematically, the web/sheet providing the surface may be configured to remain taut when the latch of the web is engaged with the attachment point of the base. See FIGS. 15A-15D. The surface may be configured to remain taut when a mass is placed on the surface and the latch of the web is engaged with the attachment point of the base. See FIGS. 19A-19D. The surface may be configured to remain taut when a mass is placed on the surface by operation of the roller to tension the web and the latch of the web is engaged with the attachment point of the base.

According to an exemplary embodiment, the component may comprise a seat to engage the latch when the web is fully retracted onto the roller. The base may comprise the seat. The web when fully extended may be configured to extend from the seat of the base to the attachment point of the base. The web when released may be configured to retract from the attachment point of the base into the seat of the base and onto the roller. The control may be configured to operate the actuator so that the web is retracted onto the roller when the controller is actuated. The latch may be configured to operate the actuator so that the web is retracted onto the roller when the latch is released and controller is actuated. The actuator may comprise a motor. The actuator may comprise a linear actuator. The component may comprise an actuation system; the actuation system may comprise the actuator. The actuation system may comprise the actuator; the actuator may comprise a motor configured to operate the roller. The base may comprise the roller. The base may comprise the actuation system.

According to an exemplary embodiment as shown schematically in FIGS. 2C, 3A-3D, 9, 10A-10D, 11A-11D, 12A-12C, 13, 14A-14D, 15A-15D, 18 and 19, a component for a vehicle/vehicle interior may comprise a base comprising an attachment point, a roller, a web shown as sheet S comprising a catch configured to extend between the roller and the attachment point of the base; an actuator configured to operate the roller; the catch of the web may be configured to engage the attachment point of the base when the web is fully extended; the actuator may be configured to retract the web onto the roller when the catch of the web is disengaged from the attachment point of the base. See e.g. FIGS. 16A-16D and 17A-17D.

According to an exemplary embodiment as shown schematically in FIGS. 9, 10A-10D, 11A-11D, 12A-12C, 13, 14A-14D, 15A-15D, 18 and 19, a component for a vehicle/vehicle interior be configured for a base comprising an attachment point; the component may comprise a roller, a web shown as sheet S comprising a catch configured to extend between the roller and the attachment point of the base, a motor configured to operate the roller; the catch of the web may be configured to engage the attachment point of the base when the web is fully extended; the motor may be configured to tension the web onto the roller when the catch of the web is engaged with the attachment point of the base. The component may comprise the base. See e.g. FIGS. 2C and 3A-3D. The motor may be operated by a controller. See e.g. FIGS. 10A-10D, 11A-11D, 13, 14A-14D, 15A-15D. The motor may comprise an actuator; and the actuator may be configured to retract the web onto the roller when the catch of the web is disengaged from the attachment point of the base. The web may be wound onto the roller when retracted. The web may be spooled onto the roller when retracted and extended from the roller when extended. See e.g. FIGS. 16A-16D and 17A-17D.

According to an exemplary embodiment as shown schematically in FIGS. 4, 5A-5B, 6, 7A-7B, 8A-8D and 9, a component C (also shown as component 1000/1000x) for a vehicle/vehicle interior may be configured for a base comprising an attachment point; the component may comprise a roller (300/300x), a web shown as sheet S configured to extend between the roller and the attachment point of the base, a lock mechanism (400) coupled to the roller; the lock mechanism may be configured to provide (1) a locked state to restrain movement of the roller and (2) a released state to allow movement of the roller and the web. See also FIGS. 3A-3D, 4, 5A-5B, 7A-7B and 8A-8D. The lock mechanism may comprise a button (shown as button B); the button may be configured to operate the lock mechanism between the locked state and the released state. See also FIGS. 5A-5B, 7A-7B and 8A-8D. The web may be wound onto the roller when retracted and extended from the roller when extended. The web may comprise a catch configured to engage the attachment point of the base when the web is fully extended. The lock mechanism may comprise a gear coupled to the roller and a pawl configured to engage the gear to provide the locked state; the pawl is disengaged from the gear to provide the released state. The gear may comprise a sawtooth gear. The lock mechanism may comprise a spring configured to urge the button to the release state. The lock mechanism may comprise a latch configured to retain the button in the engaged state. The latch may comprise a push-push latch. The component may comprise the base. The web may be spooled onto the roller when retracted and extended from the roller when extended. The web may comprise a sheet configured to provide a surface when extended and engaged at the attachment point. See also FIGS. 2A-2E, 3A-3D, 6 and 9.

According to an exemplary embodiment as shown schematically in FIGS. 2A-2E, 3A-3D, 4, 5A, 5B, 7A and 7B, a component C/1000/1000x for a vehicle may comprise a base 100, a roller 300/300x configured to rotate relative to base 100, a sheet S/200 coupled to roller 300/300x and configured to move between a retracted state (as shown schematically in FIG. 3A) and an extended state (as shown schematically in FIGS. 2A-2E and 3B-3D), and a lock mechanism 400. Lock mechanism 400 may be configured for a disengaged state (as shown schematically in FIGS. 4, 5A and 7A).

The component comprising a lock mechanism may be configured to block retraction of the web/sheet to provide a taut surface of the sheet when extended. The component may provide for a vehicle occupant to use a surface such as a tray in a vehicle interior (e.g. a tray/table structure that can be deployed from a stowed from a side compartment such as in an armrest/console or from the back of a seat, etc.). The web/surface/sheet that may be extended/deployed from the side for use and retracted/withdrawn to the side for stowing when not in use by the vehicle occupant. The component may be configured to provide a web/surface/structure for use by a vehicle occupant and/or to provide a surface/structure that is configured to be stowed in a retracted/compact position when not in use and to be extended to form a rigid/semi-rigid structure for the surface (e.g. web, sheet, sheet material, etc.) for use by a vehicle occupant.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for a vehicle comprising:
   (a) a base;
   (b) a roller configured to rotate relative to the base;
   (c) a sheet coupled to the roller and configured to move between a retracted state and an extended state;
   (d) a lock mechanism; and
   (e) a button;
   wherein the lock mechanism is configured for a disengaged state to allow movement of the sheet and an engaged state to block movement of the sheet;
   wherein the button is configured to move between a default position and an actuated position;
   wherein the lock mechanism comprises a latch configured to hold the button in the actuated position.

2. The component of claim 1 wherein the button is configured to move the lock mechanism to the engaged state to block movement of the sheet.

3. The component of claim 1 further comprising a spring; wherein the spring is configured to move the button toward the default position.

4. The component of claim 1 further comprising a spring; wherein the spring is configured to bias the button in default position.

5. The component of claim 1 wherein the sheet comprises at least one of (a) a fabric (b) a panel; (c) a textile; (d) a woven fabric; (e) a nylon material; (f) a mesh; (g) a polymer film laminated to a fabric; (h) a moisture resistant material.

6. The component of claim 1 wherein the sheet comprises at least one of (a) a bar; (b) an opening; (c) a pin; (d) a wire; (e) a tab; (f) a closure configured to engage at least one of (1) a console; (2) a door; (3) a seat; (4) an armrest to hold the sheet in the extended position.

7. The component of claim 1 wherein the component comprises at least one of (a) a tonneau cover; (b) a cargo cover; (c) a retractable table.

8. A component for a vehicle comprising:
   (a) a base;
   (b) a roller configured to rotate relative to the base;

(c) a sheet coupled to the roller and configured to move between a retracted state and an extended state;
(d) a lock mechanism; and
(e) a button;
wherein the lock mechanism is configured for a disengaged state to allow movement of the sheet and an engaged state to block movement of the sheet;
wherein the roller comprises a set of teeth;
wherein the lock mechanism comprises an arm configured to engage the set of teeth to hold the sheet in the extended state;
wherein the button is configured to engage the arm to provide a gap between the arm and the set of teeth;
wherein the lock mechanism comprises a spring configured to bias the arm to engage the set of teeth to hold the sheet in the extended state.

9. The component of claim 8 wherein the button comprises a latch configured to hold the button in an actuated position to prevent engagement of the button with the arm.

10. The component of claim 8 wherein the set of teeth is configured to prevent movement of the sheet toward the extended state and the retracted state.

11. The component of claim 8 further comprising a tab configured to compress the spring.

12. The component of claim 8 further comprising a tab configured to hold the arm and provide a gap between the arm and the set of teeth.

13. The component of claim 8 wherein the lock mechanism further comprises a first spring, a tab, a second spring and a latch.

14. The component of claim 13 wherein the first spring is configured to move the tab to engage the arm and move the arm out of engagement with the set of teeth and wherein the second spring is configured to move the arm to engage the set of teeth in response to compression of the first spring.

15. The component of claim 13 wherein the latch is configured to hold the first spring in a compressed state to allow the second spring to hold the arm in engagement with the set of teeth.

16. A component for a vehicle comprising:
(a) a base;
(b) a roller configured to rotate relative to the base;
(c) a sheet coupled to the roller and configured to move between a retracted state and an extended state;
(d) a lock mechanism; and
(e) an actuator;
wherein the lock mechanism is configured for a disengaged state to allow movement of the sheet and an engaged state to block movement of the sheet;
wherein the actuator is configured to move the lock mechanism to the engaged state to block movement of the sheet;
wherein the actuator is configured to move the sheet from the extended state to a tensioned state in response to movement of the sheet to the extended state.

17. The component of claim 16 wherein the actuator is configured to rotate the roller to provide tension in the sheet in the extended state.

18. The component of claim 16 further comprising a sensor; wherein the sensor is configured to send a signal to move the actuator between the default position and the actuated position.

19. The component of claim 16 wherein the actuator comprises at least one of (a) a motor; (b) a linear actuator.

20. The component of claim 16 wherein the sheet comprises a retractable surface configured for use by an occupant of the vehicle.

* * * * *